United States Patent
Throckmorton et al.

(10) Patent No.: US 7,416,118 B2
(45) Date of Patent: Aug. 26, 2008

(54) POINT-OF-SALE TRANSACTION RECORDING SYSTEM

(75) Inventors: John A. Throckmorton, Waynesburg, PA (US); Timothy A. Baily, Waynesburg, PA (US); Wade R. Cowell, Waynesburg, PA (US)

(73) Assignee: Digital Site Management, LLC, Waynesburg, PA (US)

( * ) Notice: Subject to any disclaimer, the term of this patent is extended or adjusted under 35 U.S.C. 154(b) by 0 days.

(21) Appl. No.: 11/129,583

(22) Filed: May 13, 2005

(65) Prior Publication Data

US 2005/0269405 A1    Dec. 8, 2005

Related U.S. Application Data

(60) Provisional application No. 60/571,475, filed on May 14, 2004.

(51) Int. Cl.
*G06K 15/00* (2006.01)

(52) U.S. Cl. .......................... 235/383; 235/379; 186/59

(58) Field of Classification Search ................ 235/383, 235/379; 186/60, 61, 62, 59; 705/64
See application file for complete search history.

(56) References Cited

U.S. PATENT DOCUMENTS

| | | | |
|---|---|---|---|
| 5,083,638 A | 1/1992 | Schneider | |
| 5,426,282 A | 6/1995 | Humble | |
| 5,494,136 A | 2/1996 | Humble | |
| 5,497,314 A * | 3/1996 | Novak | 705/17 |
| 5,609,223 A * | 3/1997 | Iizaka et al. | 186/61 |
| 5,747,784 A * | 5/1998 | Walter et al. | 235/383 |
| 6,056,087 A * | 5/2000 | Addy et al. | 186/61 |
| 6,080,938 A * | 6/2000 | Lutz | 177/25.15 |
| 6,105,866 A * | 8/2000 | Morrison et al. | 235/383 |
| 6,167,381 A * | 12/2000 | Swaine et al. | 705/17 |
| 6,236,736 B1 | 5/2001 | Crabtree et al. | |
| 6,263,088 B1 | 7/2001 | Crabtree et al. | |
| 6,296,184 B1 | 10/2001 | Dejaeger | |
| 6,343,739 B1 | 2/2002 | Lippert | |
| 6,354,497 B1 | 3/2002 | Lippert et al. | |
| 6,427,915 B1 | 8/2002 | Wike, Jr. et al. | |
| 6,530,520 B1 | 3/2003 | Snyder et al. | |
| 6,540,137 B1 | 4/2003 | Forsythe et al. | |
| 6,550,583 B1 * | 4/2003 | Brenhouse | 186/66 |
| 6,598,791 B2 * | 7/2003 | Bellis et al. | 235/383 |
| 6,722,473 B1 | 4/2004 | Ramachandran et al. | |
| 6,726,101 B1 | 4/2004 | McIntyre et al. | |
| 6,837,428 B2 * | 1/2005 | Lee et al. | 235/383 |
| 7,036,726 B1 * | 5/2006 | Edwards | 235/383 |

* cited by examiner

*Primary Examiner*—Ahshik Kim
(74) *Attorney, Agent, or Firm*—The Webb Law Firm, P.C

(57) ABSTRACT

A transaction recording system for use in recording a transaction occurring at a point-of-sale. The system includes a video capture device having a field of vision. The video capture device captures, produces and transmits video data signals representative of the field of vision of the device, and the video capture device is positioned within an enclosure at a desired position at the point-of-sale. The system includes a point-of-sale processing system located at or near the point-of-sale for receiving, processing, storing and/or transmitting video data signals. The field of vision of the video capture device views at least a portion of the point-of-sale during at least a portion of the transaction.

21 Claims, 23 Drawing Sheets

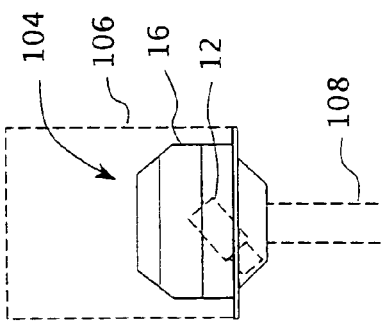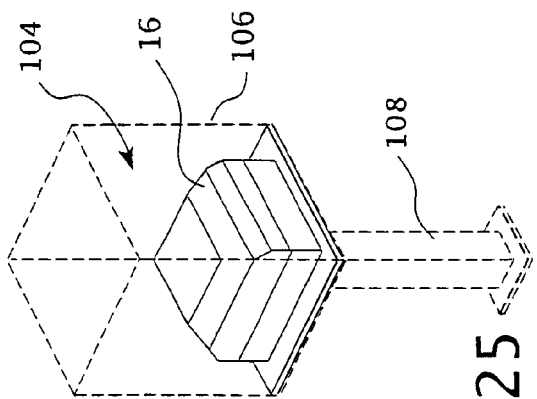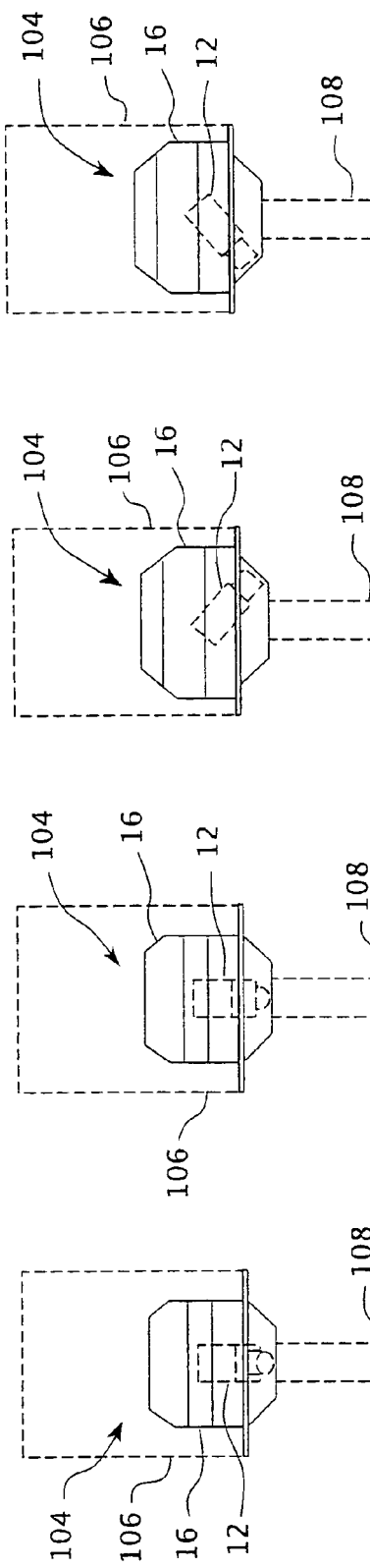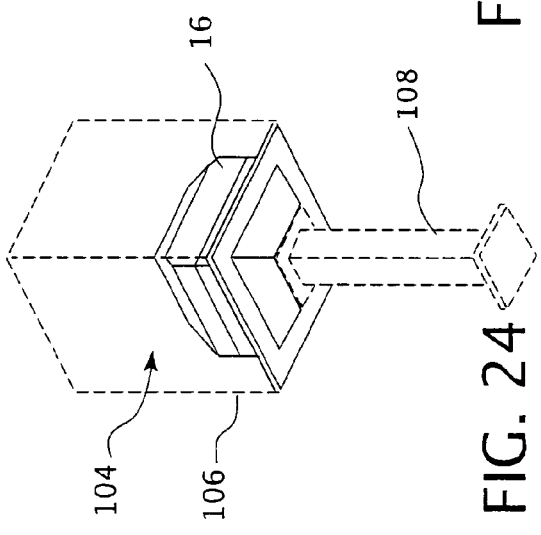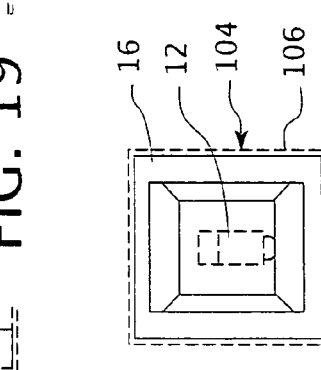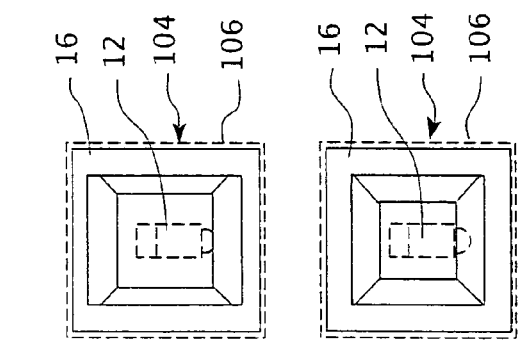
FIG. 18  FIG. 19  FIG. 20  FIG. 21
FIG. 22  FIG. 23
FIG. 24  FIG. 25

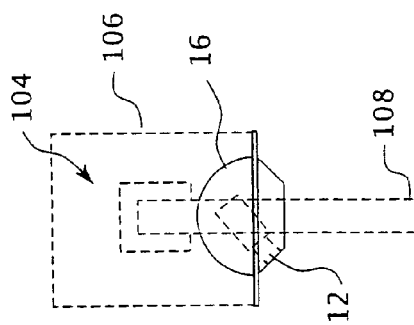
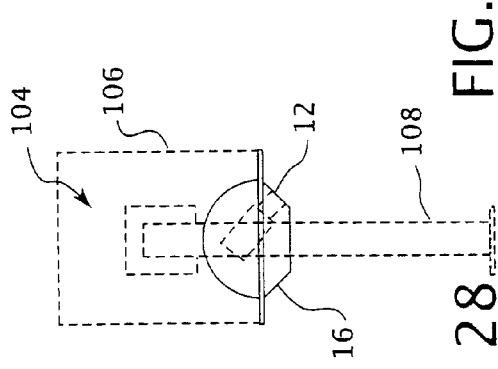
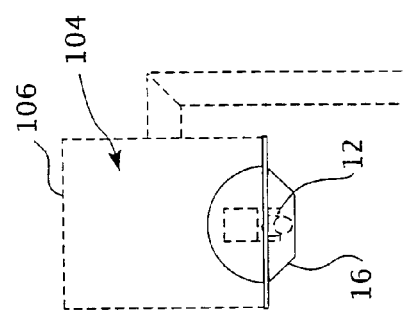
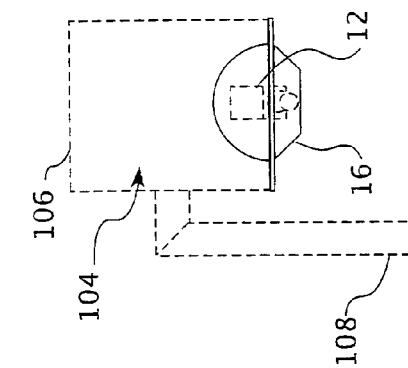
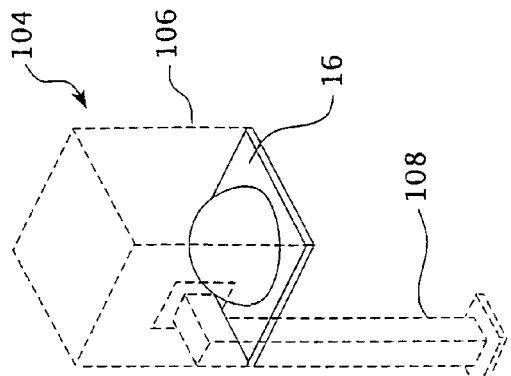
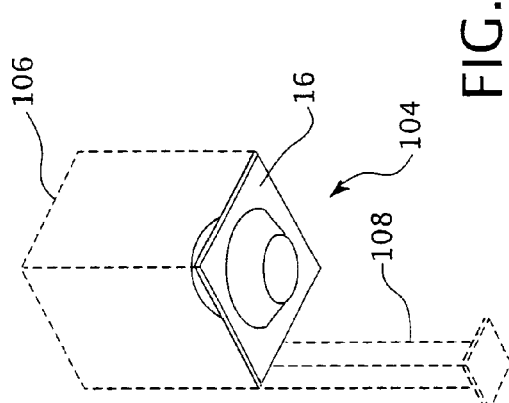
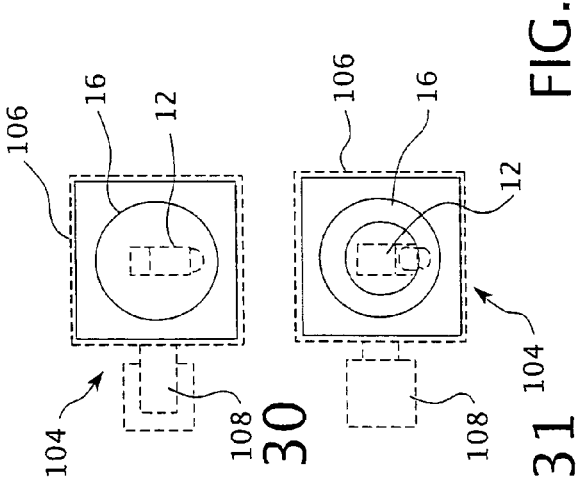

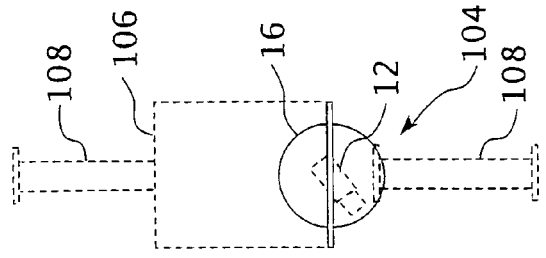
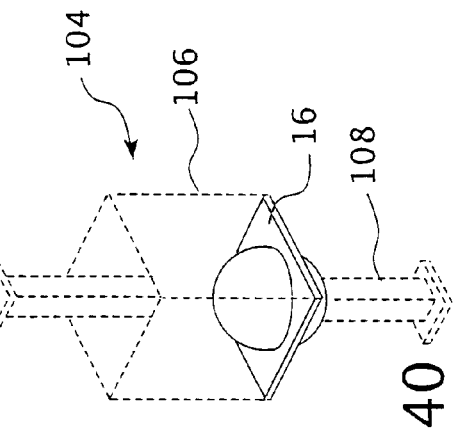
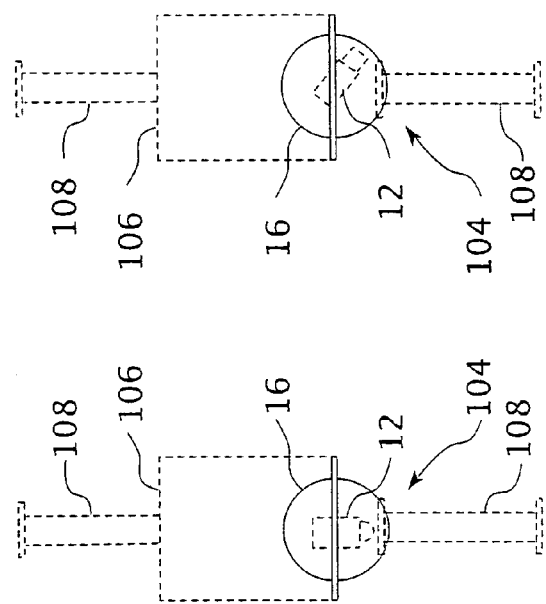
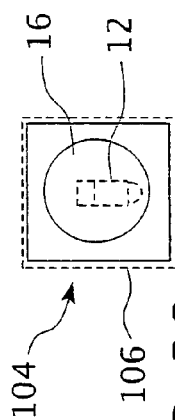
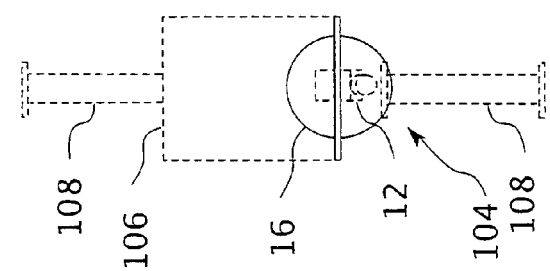

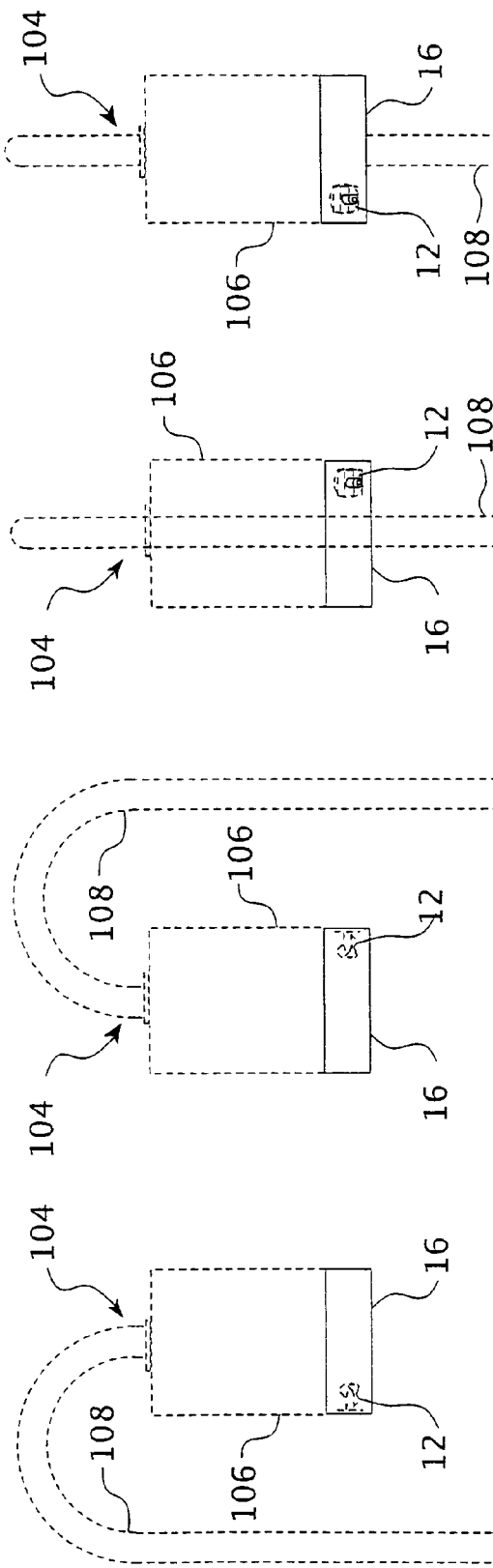

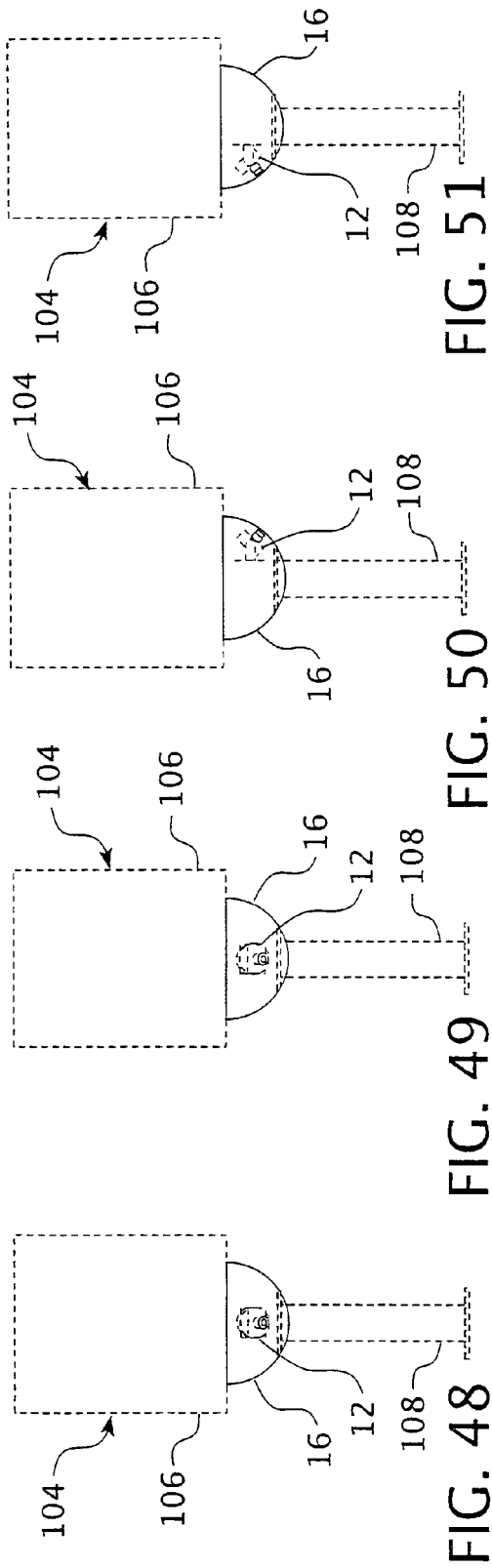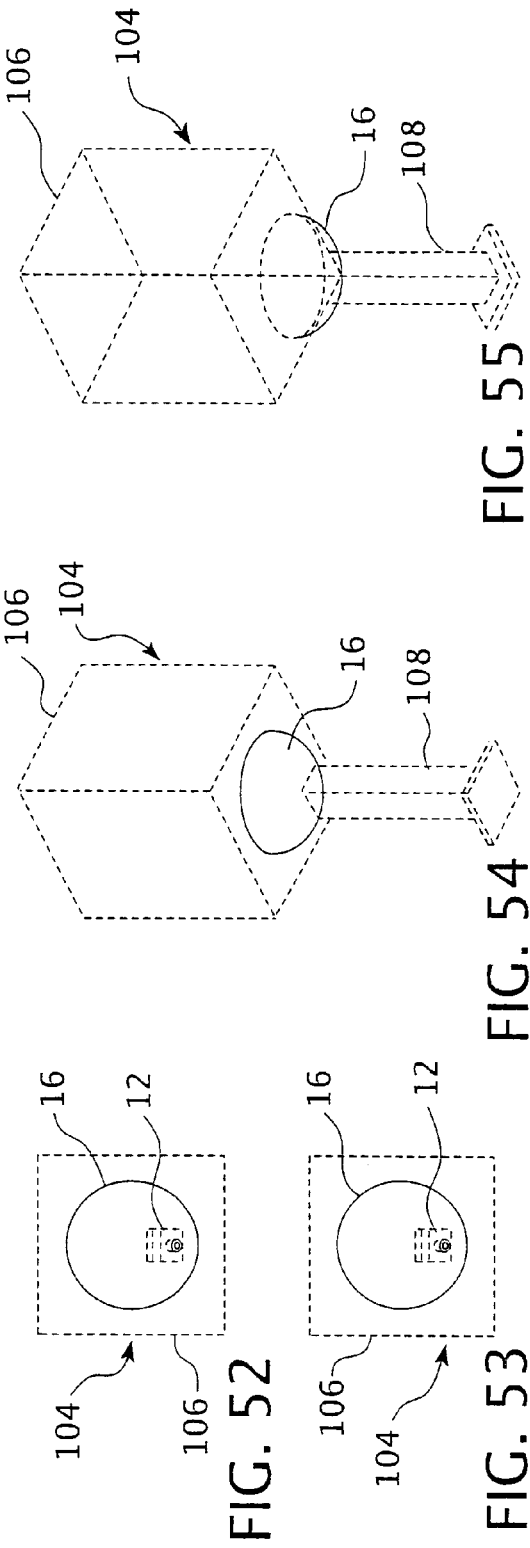

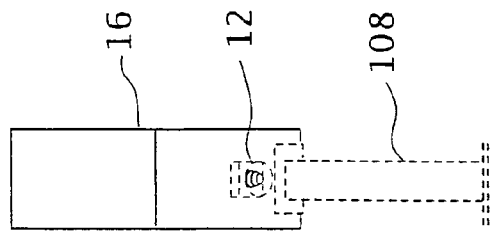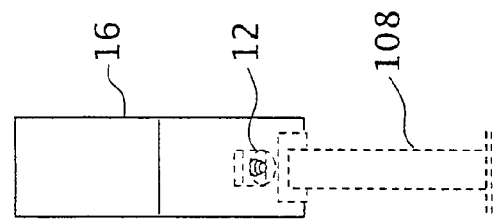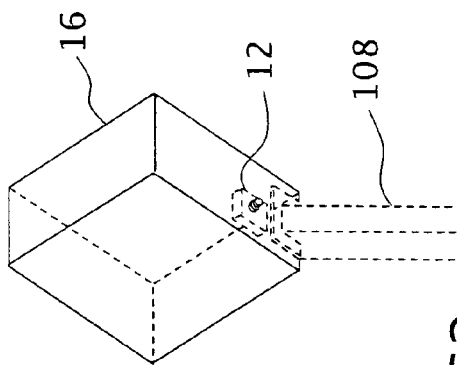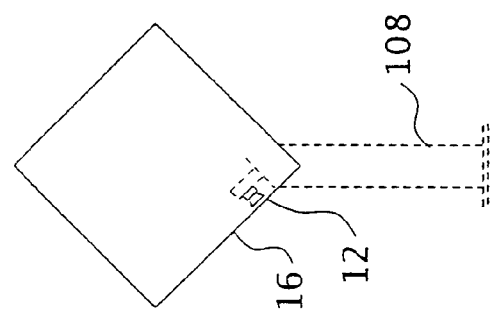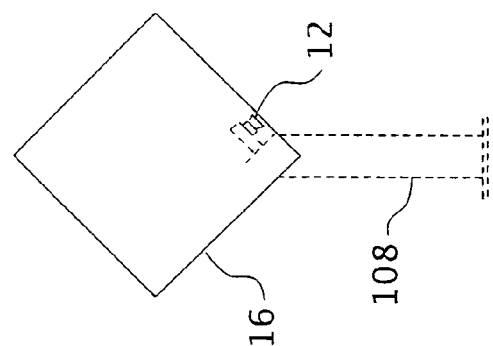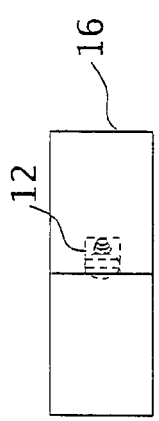

POINT-OF-SALE TRANSACTION RECORDING SYSTEM

CROSS REFERENCE TO RELATED APPLICATIONS

This application claims the benefit of U.S. Provisional Application No. 60/571,475, filed May 14, 2004, which is incorporated herein by reference in its entirety.

BACKGROUND OF THE INVENTION

1. Field of the Invention

The present invention relates generally to integrated data management systems and recording systems positioned at a point-of-sale ("POS") and, in particular, to a POS transaction recording system including a retrofit assembly for positioning a camera security system on or near a transaction location marker, such as a lane marker in a supermarket, or other such standard fixture positioned at the POS.

2. Description of the Related Art

There is a need in the art for a more dependable method of recording all possible transactions and interactions between parties. Presently, in the art, most cameras are mounted in ceilings, and the video is recorded in a separate location away from the POS system. The POS system then records the transaction information from the register to a separate system. Finally, the two systems are then merged together in yet another process called video or text overlay.

Such systems are known in the art, but have several drawbacks that result from these current processes. First, due to positioning of the camera almost directly above the POS, there are often obstacles obstructing the intended line of sight. Further, this steep angle does not provide the optimal view of the subjects. As a result, multiple cameras are required to ensure that all aspects of the transaction have been recorded. In the prior art, there are some systems that place their cameras more effectively, but the cameras are in plain sight, which in turn creates two problems: 1) the customers often feel very uncomfortable; and 2) if the customer/cashier knows where the camera is located, they can position themselves in a way that will prevent the camera from viewing its intended line of sight.

Another drawback and limitation of the prior art is the integration of the transaction information and the video away from the POS. This remote integration process requires the user to run a large number of cables, often very long distances, in order to reach the Digital Video Recorder (DVR). Such cabling can be very expensive and it tends to lose picture quality at long distances. The other problem with having a remotely-positioned DVR is that some of the people being monitored have access to areas where the DVR is stored and POS information is reviewed (e.g. cash office and computer room). These rooms are left unsupervised far more often than a cash register.

Yet another drawback in limitation of the prior art is in the field of gambling or other games of chance, where the customers and/or dealers are often monitored for cheating or other irregular behavior. Accordingly, the POS would be the gambling table, slot machine, etc. in a casino or the like. Presently, an overhead camera is positioned on the ceiling of the establishment and often referred to as the "eye in the sky". While this camera is effective in monitoring a large majority of the tables under playing conditions, it has limited angles of view and other functionality due to its central and immobile location with respect to any specific area of the casino.

SUMMARY OF THE INVENTION

It is, therefore, an object of the present invention to provide a transaction recording system that overcomes the deficiencies of the prior art. It is another object of the present invention to provide a transaction recording system that includes a video camera effectively positioned to view a desired scene of a transaction, such as a checkout lane in a supermarket. It is a further object of the present invention to provide a transaction recording system that has an enclosure that obscures the video camera from the consumer. It is a still further object of the present invention to provide a transaction recording system having an enclosure that is capable of being retrofitted on existing lane markers and other transaction or point-of-sale equipment. It is a still further object of the present invention to provide a transaction recording system that effects various video integration and storage processes at the point-of-sale.

Accordingly, the present invention is directed to a transaction recording system for use in recording a transaction occurring at a point-of-sale. The system includes a video capture device having a field of vision, and this device captures, produces and transmits video data signals representative of the field of vision of the device. Further, the video capture device is at least partially positioned within an enclosure located in a desired position with respect to the point-of-sale. The system also includes a point-of-sale processing system located at or near the point-of-sale, and this point-of-sale processing system: (i) receives video data signals; (ii) processes video data signals; (iii) stores video data signals; (iv) transmits video data signals, or any combination thereof. The field of vision of the video capture device views at least a portion of the point-of-sale during at least a portion of the transaction.

The present invention is further directed to a transaction recording system for use in recording a transaction occurring at a point-of-sale. The system includes multiple video capture devices, each having a respective field of vision and configured or adapted to capture, produce and transmit video data signals representative of the field of vision of the device. Each video capture device is at least partially positioned within an enclosure located in a desired position with respect to a respective point-of-sale. The system also includes multiple video capture systems, each in communication with a respective video capture device and located at or near the respective point-of-sale. Each video capture system: (i) receives video data signals from the respective video capture device; (ii) processes video data signals from the respective video capture device; (iii) stores video data signals from the respective video capture device; (iv) transmits video data signals from the respective video capture device, or any combination thereof. A point-of-sale central processing system is in communication with the video capture systems and is located at or near a point-of-sale. In addition, the central processing system is configured or adapted to: (i) receive video data signals from the video capture systems; (ii) process video data signals from the video capture systems; (iii) store video data signals from the video capture systems; (iv) transmit video data signals from the video capture systems, or any combination thereof. The field of vision of each video capture device views at least a portion of the respective point-of-sale during at least a portion of the transaction.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 18 is a front view of a first embodiment of an enclosure in a transaction recording system according to the principles of the present invention, and in use in connection with a lane marker;

FIG. 19 is a rear view of the enclosure of FIG. 18;

FIG. 20 is a first side view of the enclosure of FIG. 18;

FIG. 21 is a second side view of the enclosure of FIG. 18;

FIG. 22 is a top view of the enclosure of FIG. 18;

FIG. 23 is a bottom view of the enclosure of FIG. 18;

FIG. 24 is a perspective view of the enclosure of FIG. 18;

FIG. 25 is a further perspective view of the enclosure of FIG. 18;

FIG. 26 is a front view of a second embodiment of an enclosure in a transaction recording system according to the principles of the present invention, and in use in connection with a lane marker;

FIG. 27 is a rear view of the enclosure of FIG. 26;

FIG. 28 is a first side view of the enclosure of FIG. 26;

FIG. 29 is a second side view of the enclosure of FIG. 26;

FIG. 30 is a top view of the enclosure of FIG. 26;

FIG. 31 is a bottom view of the enclosure of FIG. 26;

FIG. 32 is a perspective view of the enclosure of FIG. 26;

FIG. 33 is a further perspective view of the enclosure of FIG. 26;

FIG. 34 is a front view of a third embodiment of an enclosure in a transaction recording system according to the principles of the present invention, and in use in connection with a lane marker;

FIG. 35 is a rear view of the enclosure of FIG. 34;

FIG. 36 is a first side view of the enclosure of FIG. 34;

FIG. 37 is a second side view of the enclosure of FIG. 34;

FIG. 38 is a top view of the enclosure of FIG. 34;

FIG. 39 is a bottom view of the enclosure of FIG. 34;

FIG. 40 is a perspective view of the enclosure of FIG. 34;

FIG. 41 is a front view of a fourth embodiment of an enclosure in a transaction recording system according to the principles of the present invention, and in use in connection with a lane marker;

FIG. 42 is a rear view of the enclosure of FIG. 41;

FIG. 43 is a first side view of the enclosure of FIG. 41;

FIG. 44 is a second side view of the enclosure of FIG. 41;

FIG. 45 is a top view of the enclosure of FIG. 41;

FIG. 46 is a bottom view of the enclosure of FIG. 41;

FIG. 47 is a perspective view of the enclosure of FIG. 41;

FIG. 48 is a front view of a fifth embodiment of an enclosure in a transaction recording system according to the principles of the present invention, and in use in connection with a lane marker;

FIG. 49 is a rear view of the enclosure of FIG. 48;

FIG. 50 is a first side view of the enclosure of FIG. 48;

FIG. 51 is a second side view of the enclosure of FIG. 48;

FIG. 52 is a top view of the enclosure of FIG. 48;

FIG. 53 is a bottom view of the enclosure of FIG. 48;

FIG. 54 is a perspective view of the enclosure of FIG. 48;

FIG. 55 is a further perspective view of the enclosure of FIG. 48;

FIG. 56 is a front view of a sixth embodiment of an enclosure in a transaction recording system according to the principles of the present invention;

FIG. 57 is a rear view of the enclosure of FIG. 56;

FIG. 58 is a first side view of the enclosure of FIG. 56;

FIG. 59 is a second side view of the enclosure of FIG. 56;

FIG. 60 is a top view of the enclosure of FIG. 56;

FIG. 61 is a bottom view of the enclosure of FIG. 56; and

FIG. 62 is a perspective view of the enclosure of FIG. 56.

DETAILED DESCRIPTION OF THE PREFERRED EMBODIMENTS

Figure 1:
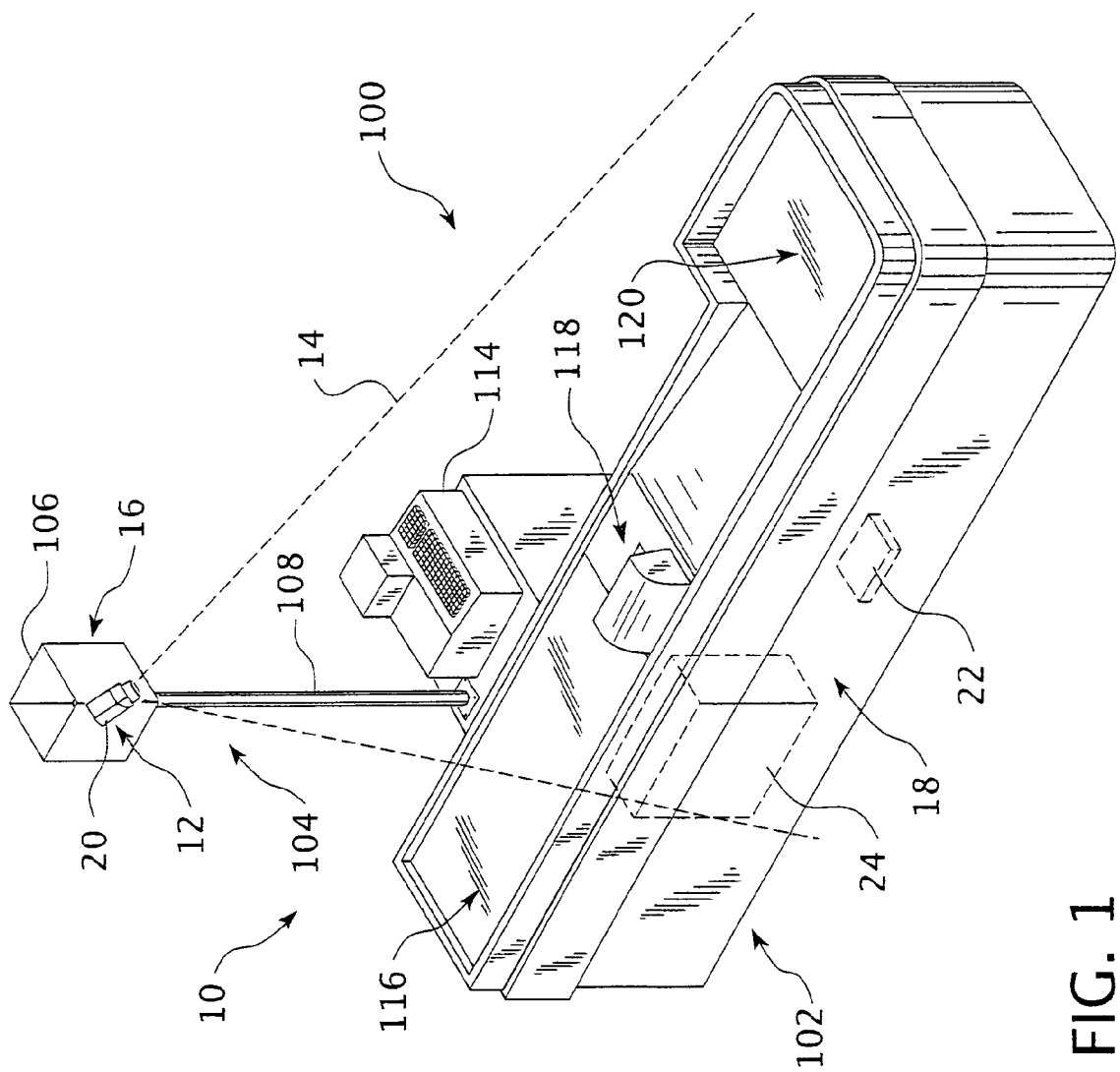
FIG. 1 is a perspective and cutaway view of one embodiment of a transaction recording system according to the principles of the present invention at a point-of-sale.

The present invention is directed to a transaction recording system 10, as shown in various embodiments in FIGS. 1-17, and this transaction recording system 10 is specifically configured or adapted to be used in connection with recording a transaction occurring at a point-of-sale (P0S) 100, as shown in various embodiments in FIGS. 1-3 and 15-17. The P0S 100 can be located at any area where a person or customer is engaged in a transaction, such as the purchasing of goods or services, the transaction or interaction between two people, a gambling table, or other similar transactional location. For example, the P0S 100 can be located at a supermarket, retail store, transportation terminal, casino, entertainment area, etc. The transaction recording system 10 of the present invention is particularly useful in a supermarket setting, where the POS 100 is a checkout lane 102. Further, the transaction recording system 10 of the present invention is also useful in connection with a casino setting, where the P0S 100 is any individual or group of individual gambling tables, slot machines, games-of-chance, etc.

According to the prior art, a checkout lane 102 typically includes a lane marker 104 having a marker enclosure 106 mounted to a pole 108. As is known in the art, the marker enclosure 106 typically houses a light 110, such that the marker enclosure 106 is illuminated and clearly visible by the customers. Further, through the use of the light 110, the marker enclosure 106 will indicate whether the checkout lane 102 is "open" or "closed".

Another structure that is typically located at a checkout lane 102 is a rack display 112, which offers various goods to the customer for perusal while he or she is waiting in line to move through the checkout lane 102. Further, each checkout lane 102 includes a cash register 114, as well as a product collection area 116, where the customer places his or her items, a product scanning area 118, where the employee scans the items and a product bagging area 120, where the scanned items collect and are placed into bags by another employee.

While a checkout lane 102, as typically embodied in a supermarket has been discussed above, it is envisioned that the transaction recording system 10 of the present invention can be used in connection with any POS 100. It is the purpose of the transaction recording system 10 to record various areas, persons and other objects at the POS 100 before, during and after a transaction has occurred.

Figure 2:
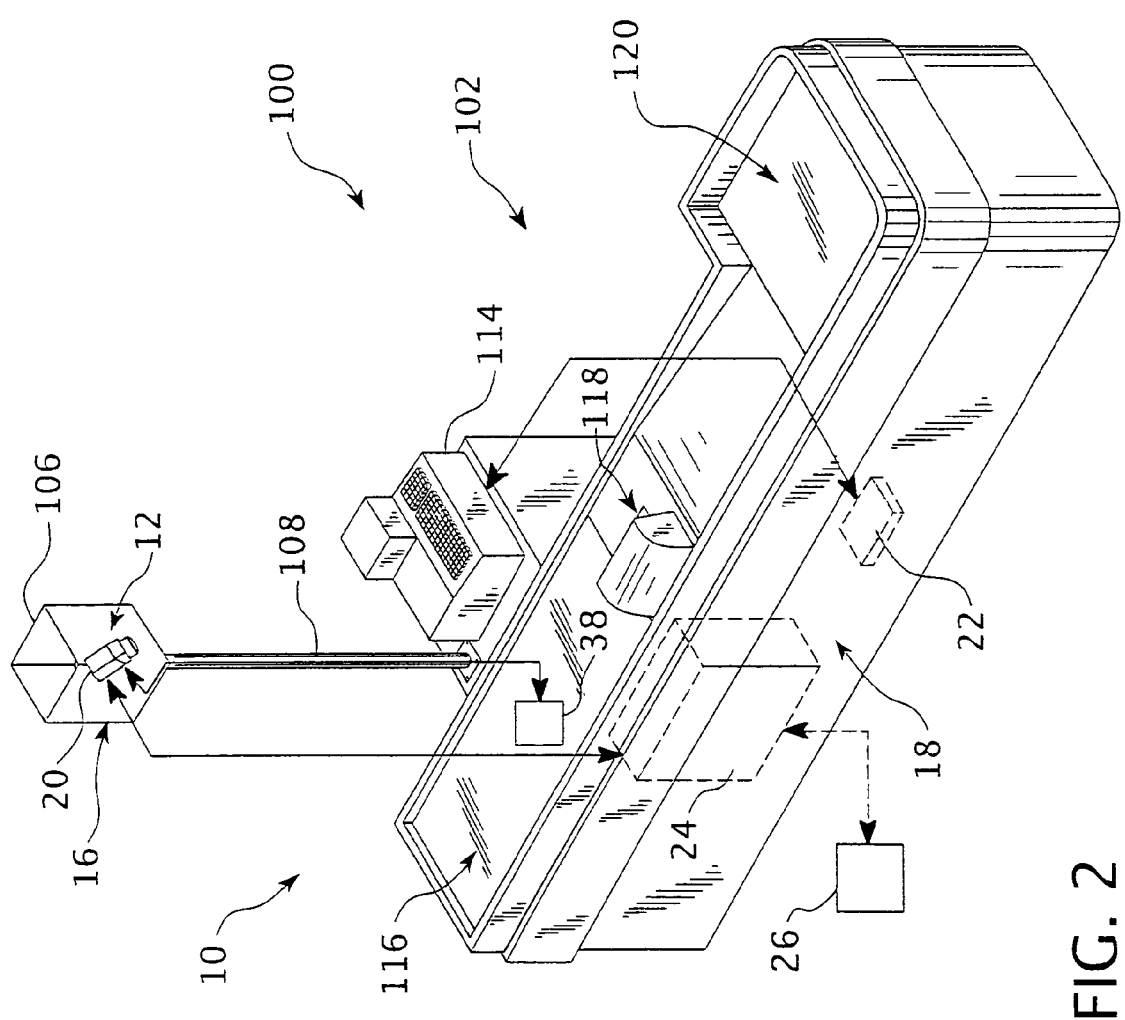
FIG. 2 is a perspective, cutaway and schematic view of the transaction recording system and point-of-sale of FIG. 1.
Figure 3:
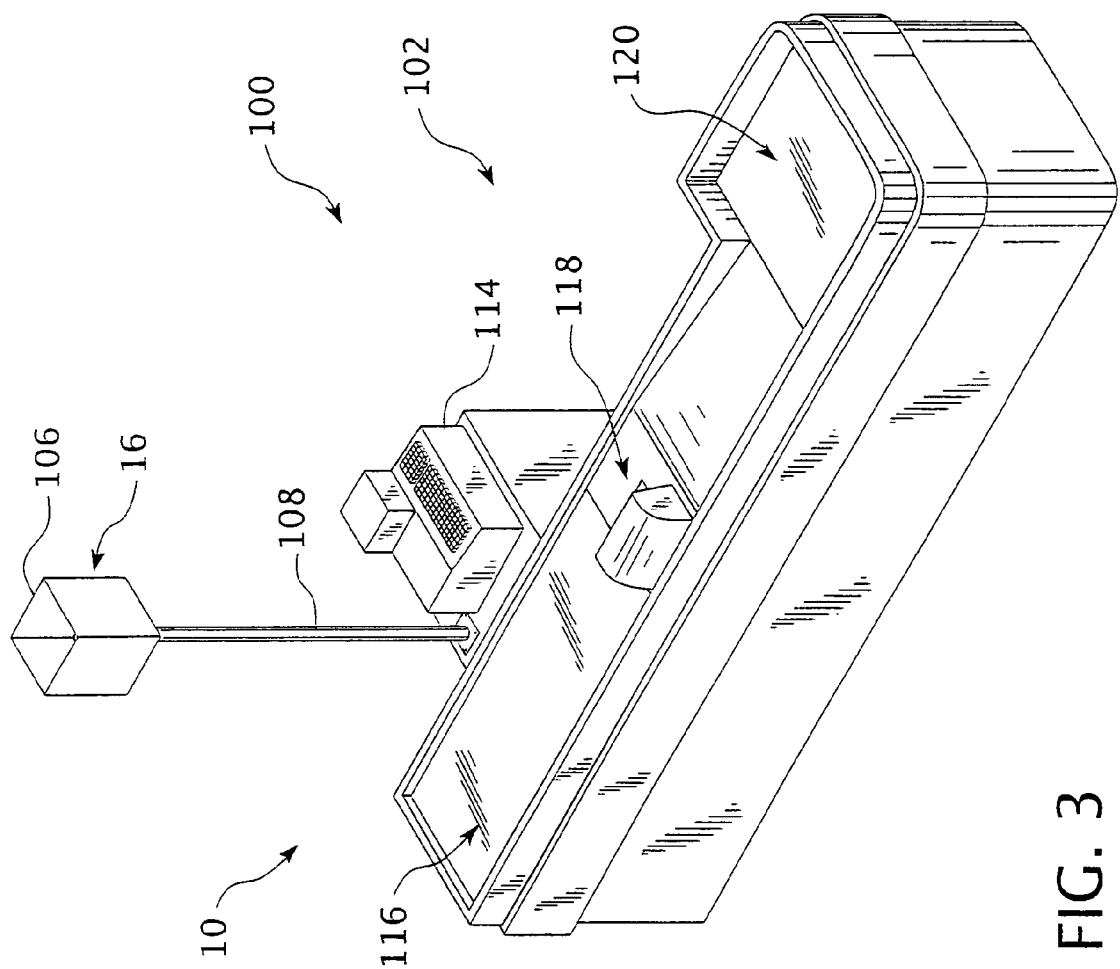
FIG. 3 is a perspective view of the transaction recording system and point-of-sale of FIG. 1.

With reference to the present invention, and as best seen in FIGS. 1-3, the transaction recording system 10 includes a video capture device 12, and this video capture device 12 includes a field of vision 14. Further, the video capture device 12 is capable of capturing, producing and/or transmitting video data signals that are representative of the field of vision 14 of the video capture device 12. Still further, the video capture device 12 is at least partially positioned within an enclosure 16. The enclosure 16 is located in a desired position with respect to the POS 100.

The transaction recording system 10 also includes a point-of-sale (POS) processing system 18. The POS processing system 18 is located at or near the POS 100, and the processing system 18 is capable of receiving the video data signals, processing the video data signals, storing the video data signals and/or transmitting the video data signals. In addition, the field of vision 14 of the video capture device 12 views at least a portion of the POS 100 during at least a portion of the transaction.

In the embodiment of FIGS. 1-3, the video capture device 12 is mounted or otherwise located within the marker enclosure 106, which may act as the enclosure 16 or in conjunction with a separate and distinct enclosure (as shown in FIGS. 18-55). Specifically, the video capture device 12 is a camera 20 that is positioned within the marker enclosure 106 of the lane marker 104, and is therefore mounted at a high angle on a pole 108 and with respect to the POS 100. Such positioning maximizes the field of vision 14 and provides appropriate visual coverage of virtually the entire POS 100, such as the checkout lane 102. In particular, the camera 20, and the field of vision 14 of the camera 20, is able to view the cash register 114, the product collection area 116, the product scanning area 118, the product bagging area 120, as well as the employees (not shown), such as the cashier, bagger, etc., and the customer (not shown). When the transaction recording system 10 is used in connection with a P0S 100 in a casino or similar establishment, the field of vision 14 of the camera 20 or video capture device 12 includes a specified area, a table, a gambling table, an employee, a dealer, a customer, an observer, a gambling area, a slot machine, or any combination thereof.

Also, in this embodiment, the POS processing system 18 includes a point-of-sale (POS) data converter 22, and a point-of-sale (POS) central processing unit 24. Accordingly, in this embodiment, and as best seen in schematic form in FIG. 2, the POS central processing unit 24 receives the video data signals from the video capture device 12. The POS data converter 22 is in communication with and receives data from the cash register 114. The POS data converter 22 processes and otherwise converts this data to a usable and digital format, and subsequently transmits this data to the POS central processing unit 24.

As discussed above, the POS processing system 18, and in one embodiment the POS data converter 22, is capable of receiving, processing, generating and/or transmitting point-of-sale (POS) data from various portions of the POS 100 and converting this data to a usable format by the POS processing system 18, such as the POS central processing unit 24.

While FIG. 2 shows the POS data converter 22 in communication with a cash register 114, this POS data converter 22 and/or the POS central processing unit 24 may be in communication with a variety of systems and subsystems in order to collect important and pertinent POS data before, during and after the transaction. Accordingly, the POS processing system 18 may collect any POS data, including, e.g., transaction time, transaction date, transaction location, transaction data, point-of-sale location, employee data, employer data, customer data, goods data, item data, identification data, register data, employee/customer interaction data, installation data, etc. Specifically, the POS processing system 18 can collect any amount of data that can be used in connection with the video data signal received from the video capture device 12 to provide a complete picture and recording of the entire transaction, as well as each action and interaction taking place during the transaction.

It is also envisioned that the POS processing system 18 is configured to or otherwise includes the appropriate software to integrate the video data signals received from the video capture device 12 and the POS 100 data into an integrated, overlay data signal. For example, in the above embodiment, the POS central processing unit 24 receives the video data signals from the video capture device 12. Further, the POS data converter 22 receives raw data from the cash register 114, and converts this raw data into appropriate and digitized POS data, which is then transmitted to the POS central processing unit 24. Finally, the POS central processing unit 24 integrates the data signals, such as by textual overlay and other integration techniques that are known in the art.

In some instances, it may not be beneficial or secure to store or otherwise save the video data signals, the POS data, and/or the integrated data signals and information at the POS processing system 18, such as on the POS central processing unit 24. Accordingly, the integrated data signal, and/or any of the other data signals or information can be transmitted to a central storage and processing system 26. Accordingly, the central storage and processing system 26 could be positioned in a secured location away from the POS 100, such as in the manager's office or some other secured location or vault. Still further, the data could be wirelessly transmitted offsite to some other secure location.

As best seen in FIG. 3, when the enclosure 16, whether the marker enclosure 106 itself, or positioned within or attached to the marker enclosure 106, the video capture device 12, such as the camera 20, is not visually noticeable by the customer and/or employee. Therefore, the customer and the employee merely see the checkout lane 102 in its normal setting with the lane marker 104. This allows appropriate surveillance of the POS 100, including all of the individuals engaged in the transaction. While shown positioned on or within, or as part of, the lane marker 104 in FIGS. 1-3, the enclosure 16 may be positioned adjacent, on, within or otherwise integrated with various parts and portions of the POS 100, as discussed in detail in connection with various embodiments hereinafter. For example, the enclosure 16 may be positioned adjacent, on, within or integrated with the lane marker 104, a check stand light, a checkout lane sign, a rack display 112, a cash register 114, a dome, an elevated enclosure 16, etc. While not necessary, it is often desirable to place the enclosure 16, and thus the video capture device 12, at an elevated position with respect to at least a portion of the POS 100.

Further, the enclosure 16 may take any shape or size, and may be manufactured from a variety of materials. Also, the enclosure 16 may include brackets or other means for engaging the video capture device 12. For example, a pair of hinged brackets may be attached to the video capture device 12, thus allowing adjustment thereof. The video capture device 12 may be rotatable, movable, or even automatically controlled, as discussed hereinafter.

Figure 4:
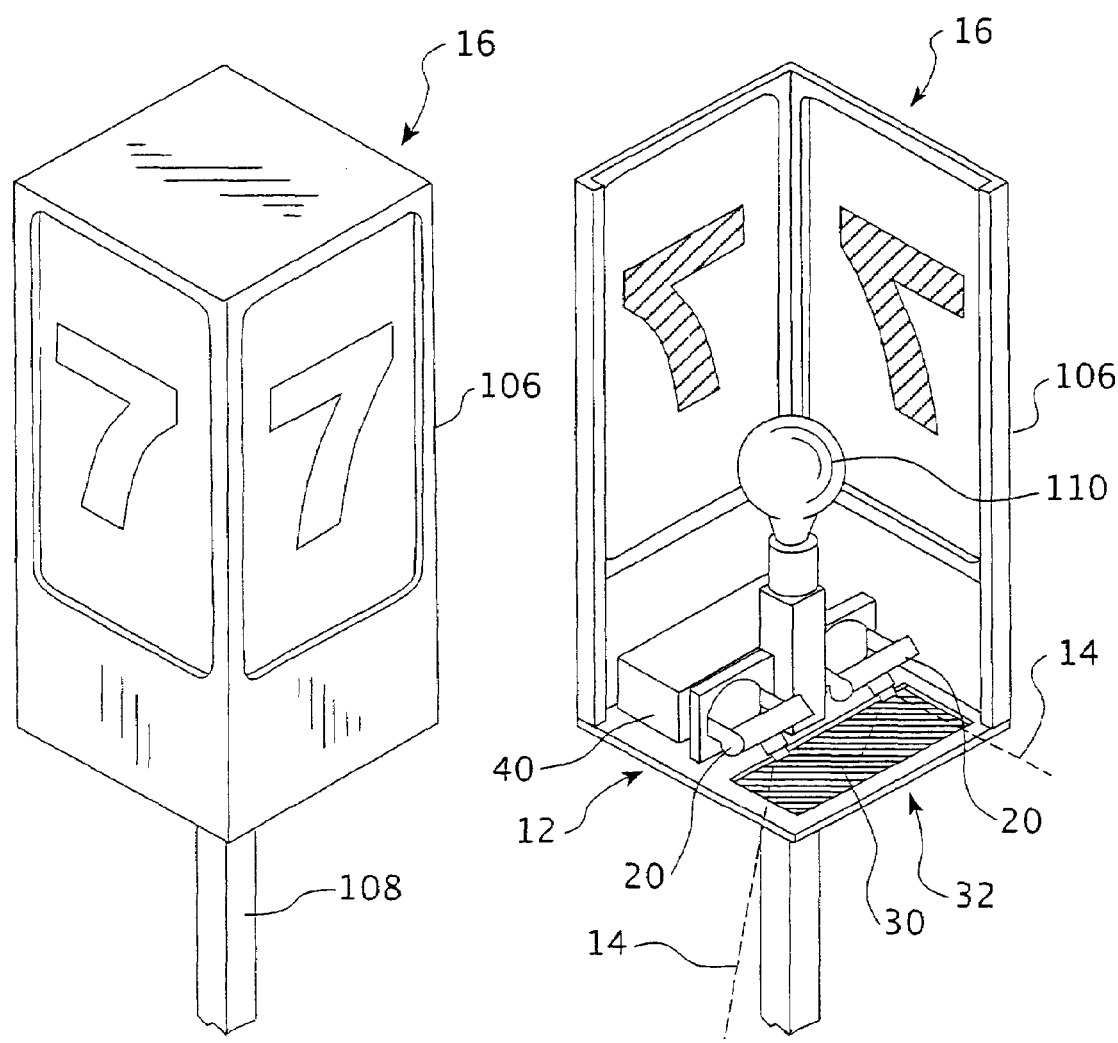
FIG. 4 is a perspective and cutaway view of one embodiment of a transaction recording system according to the principles of the present invention.

As shown in the embodiment of FIG. 4, multiple video capture devices 12, or cameras 20, can be positioned within the marker enclosure 106, acting as the enclosure 16. In order to obtain an unobstructed field of vision 14, the enclosure 16 must include some surface 28 that is at least partially transparent, or some opening 30 that allows the camera 20 to have an appropriate field of vision 14 and collect and produce useful video data signals. In this manner, the video capture device 12 is capable of capturing the video data signals when the field of vision 14 is directed through the surface 28 or opening 30.

As shown in the embodiment of FIG. 4, the cameras 20 and their respective fields of vision 14 are directed down through an opening 30, and in this case one or more of the openings 30 of a grate 32. However, as opposed to a grate 32, the one or more openings 30 can be in the form of a vent, a crack, an orifice, etc., as long as the video capture device 12 has an appropriate field of vision 14 that allows the capture and production of video data signals that are useful in recording the transaction at the POS 100.

Figure 5:
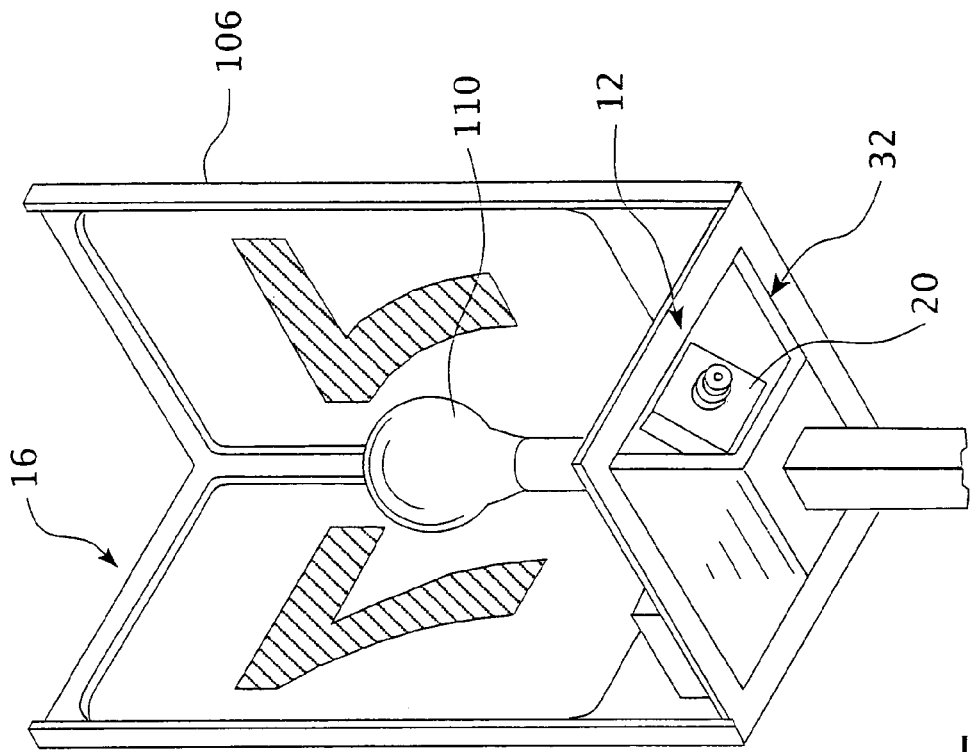
FIG. 5 is a perspective and cutaway view of a further embodiment of a transaction recording system according to the principles of the present invention.
Figure 5:
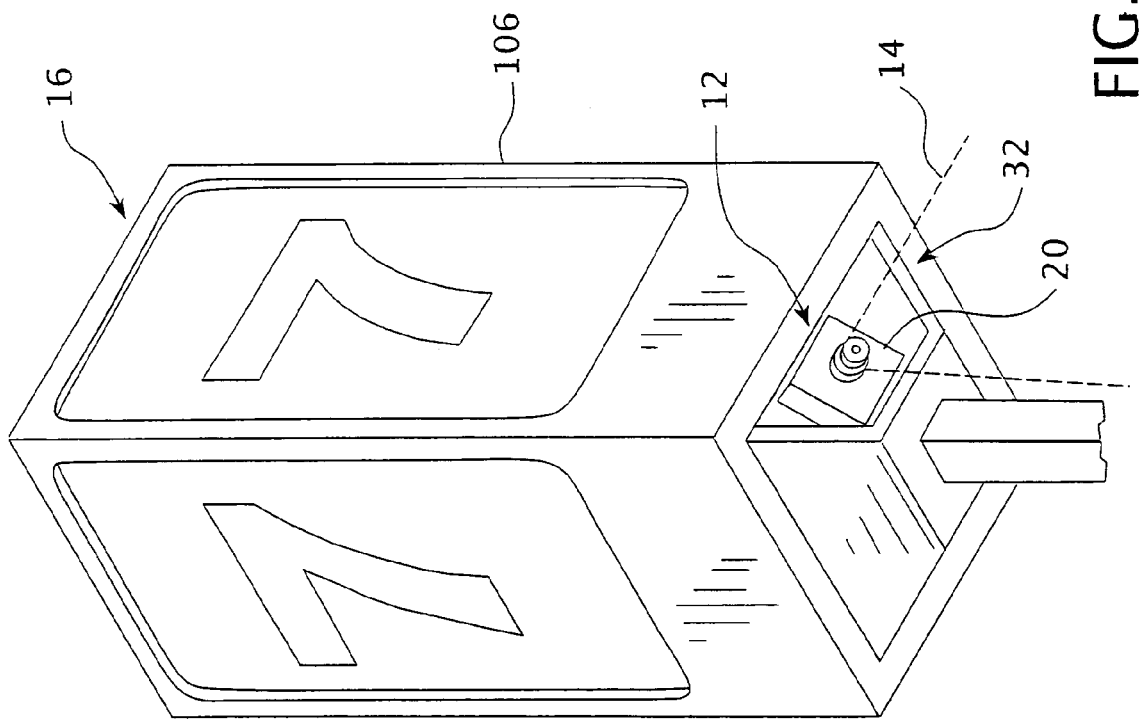

Also as seen in the embodiment of FIG. 4, the cameras 20 are positioned adjacent the pole 108, which extends through the marker enclosure 106 and terminates in a fixture for the light 110. In the embodiment of FIG. 5, only a single camera 20 is used and the field of vision 14 of the video capture device 12 is directed through the grate 32, which includes a plurality of openings 30.

Figure 6:
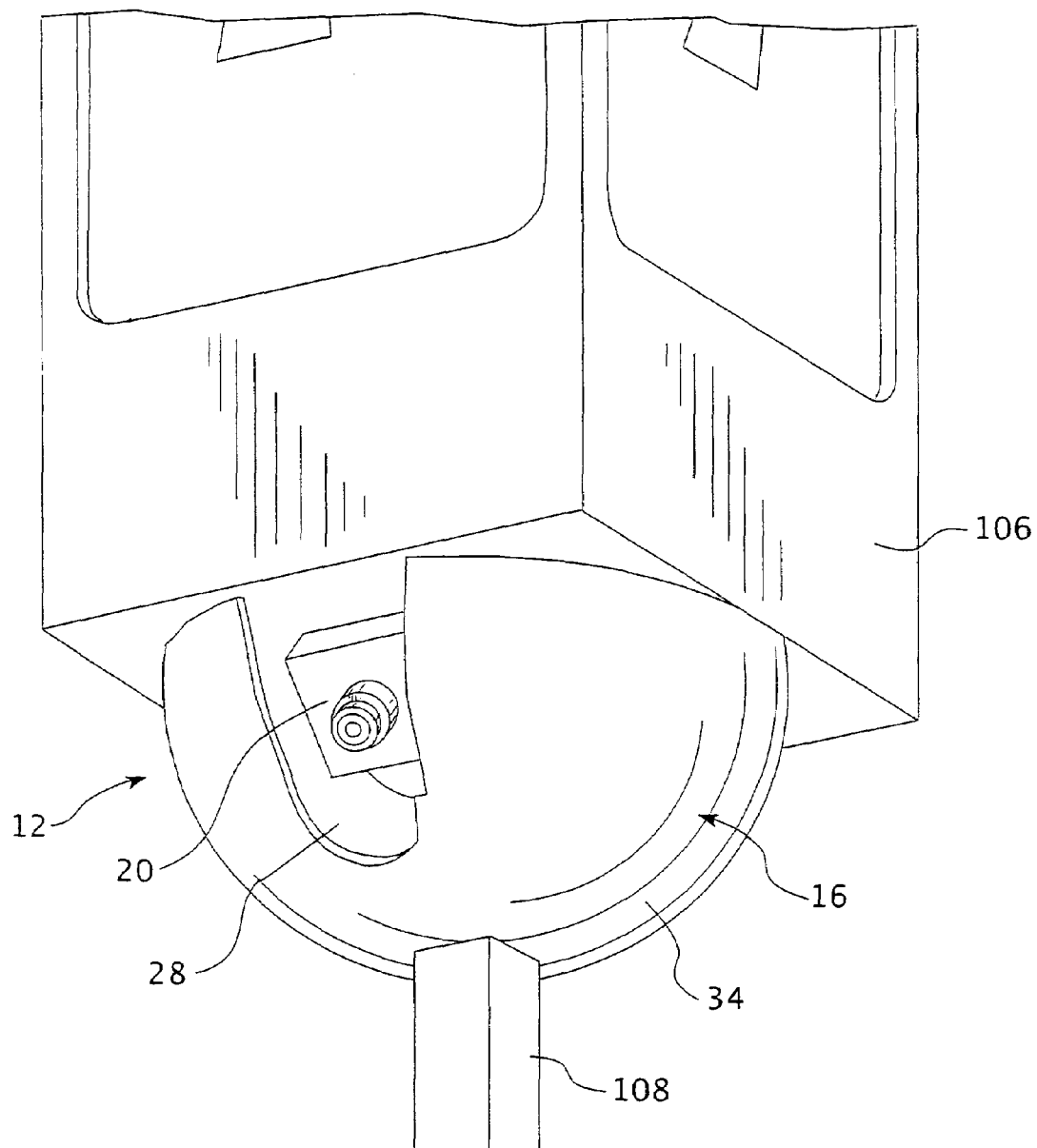
FIG. 6 is a perspective view of a further embodiment of a transaction recording system according to the principles of the present invention.

With reference to FIG. 6, the enclosure 16 is mounted on the pole 108, and the marker enclosure 106 is attached to or otherwise placed upon a portion of the enclosure 16. In particular, in this embodiment, the enclosure 16 is a semicircular enclosure 34. Further, a semi-transparent surface 28, which is at least partially transparent, allows the video capture device 12 to direct the field of vision 14 at the POS 100. It is envisioned that this surface 28 can be clear plastic, tinted plastic, clear glass, tinted glass, etc.

Figure 7:
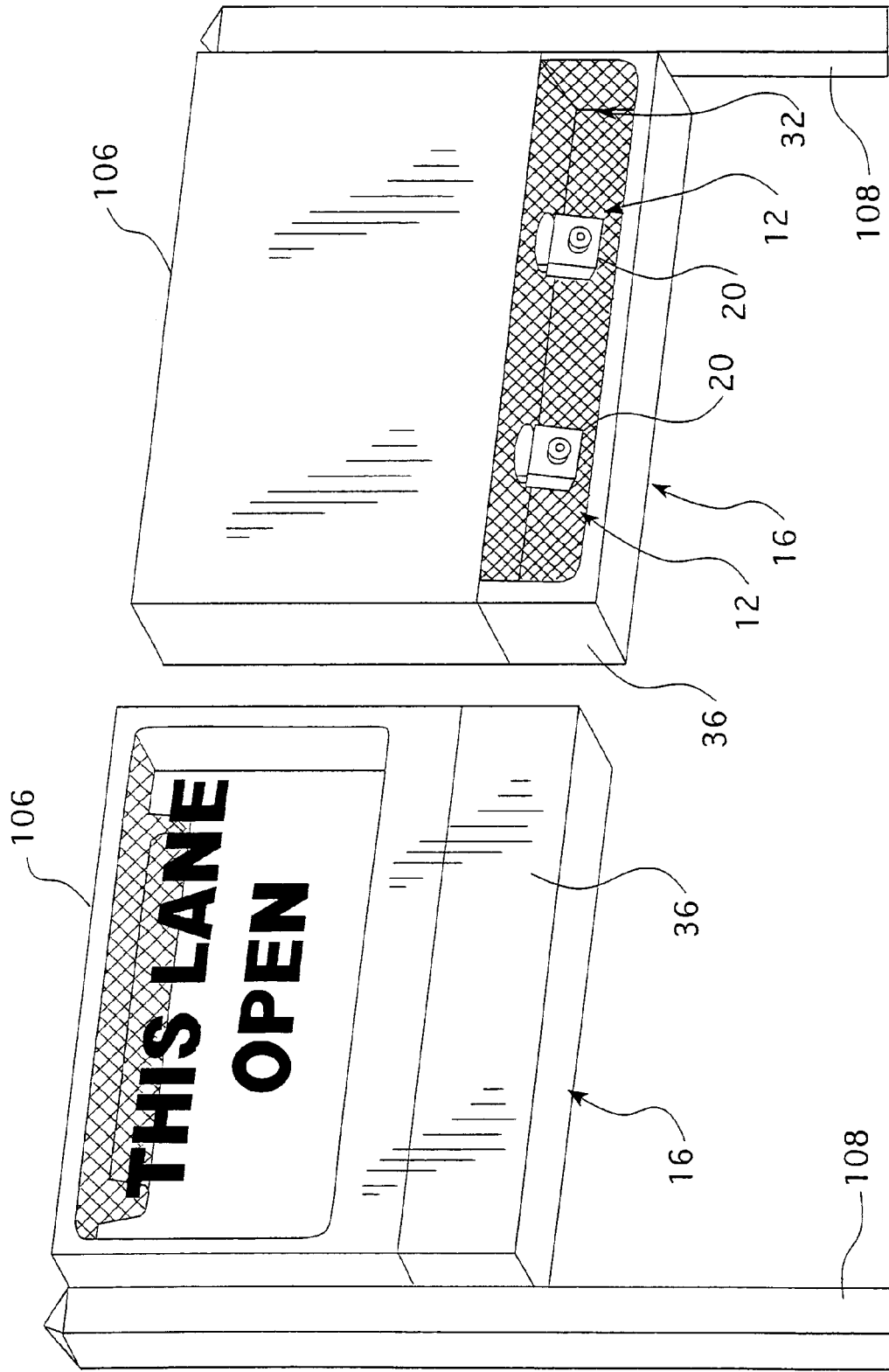
FIG. 7 is a front and rear perspective view of a further embodiment of a transaction recording system according to the principles of the present invention.

Another embodiment of the transaction recording system 10 is illustrated in FIG. 7. In this embodiment, multiple cameras 20 are positioned within an enclosure 16 that is attached to or otherwise integrated with the marker enclosure 106. Specifically, the cameras 20 are placed in a box enclosure 36, and the box enclosure 36 includes a grate 32, through which the cameras 20 direct their respective fields of vision 14. Of course, the openings 30 and the grate 32 are illustrated as being much larger than they normally are in order to fully illustrate the invention. However, in practice, the openings 30 of the grate 32 are much smaller, such that the customer and/or employee could not visually notice the cameras 20.

Figure 8:
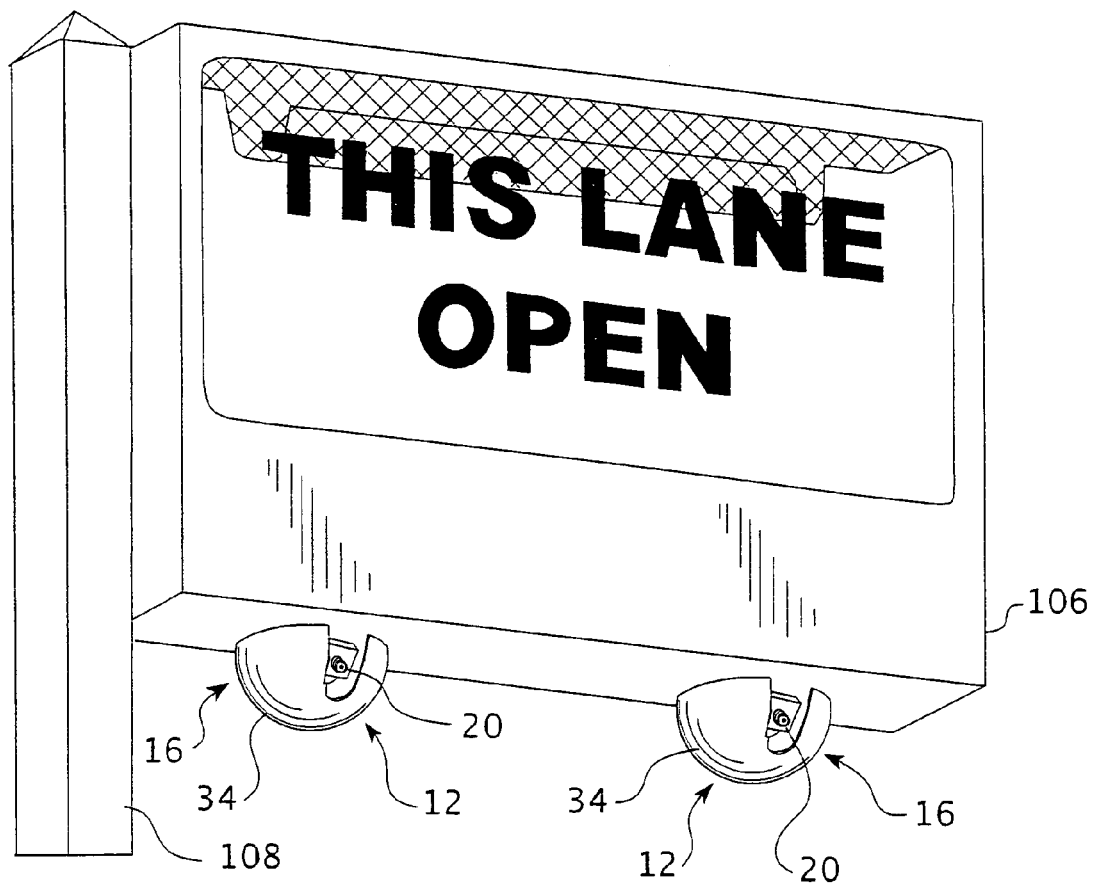
FIG. 8 is a perspective view of a still further embodiment of a transaction recording system according to the principles of the present invention.

In the embodiment of FIG. 8, two semicircular enclosures 34 are attached to the bottom of the marker enclosure 106. Each of these semicircular enclosures 34 house a respective camera 20, and it is envisioned that each of the cameras 20 direct their respective fields of vision 14 at various portions of the POS 100. While, as discussed above, the semicircular enclosure 34 may include a surface 28, such as a tinted glass or smoked glass, the enclosures 34 may also simply include an opening 30 large enough to allow an unobstructed or partially obstructed field of vision 14 of the camera 20. Importantly, the video capture device 12 only needs to capture and process an appropriate amount of video data signals to identify the actions and interactions occurring at the POS 100.

Figure 9:
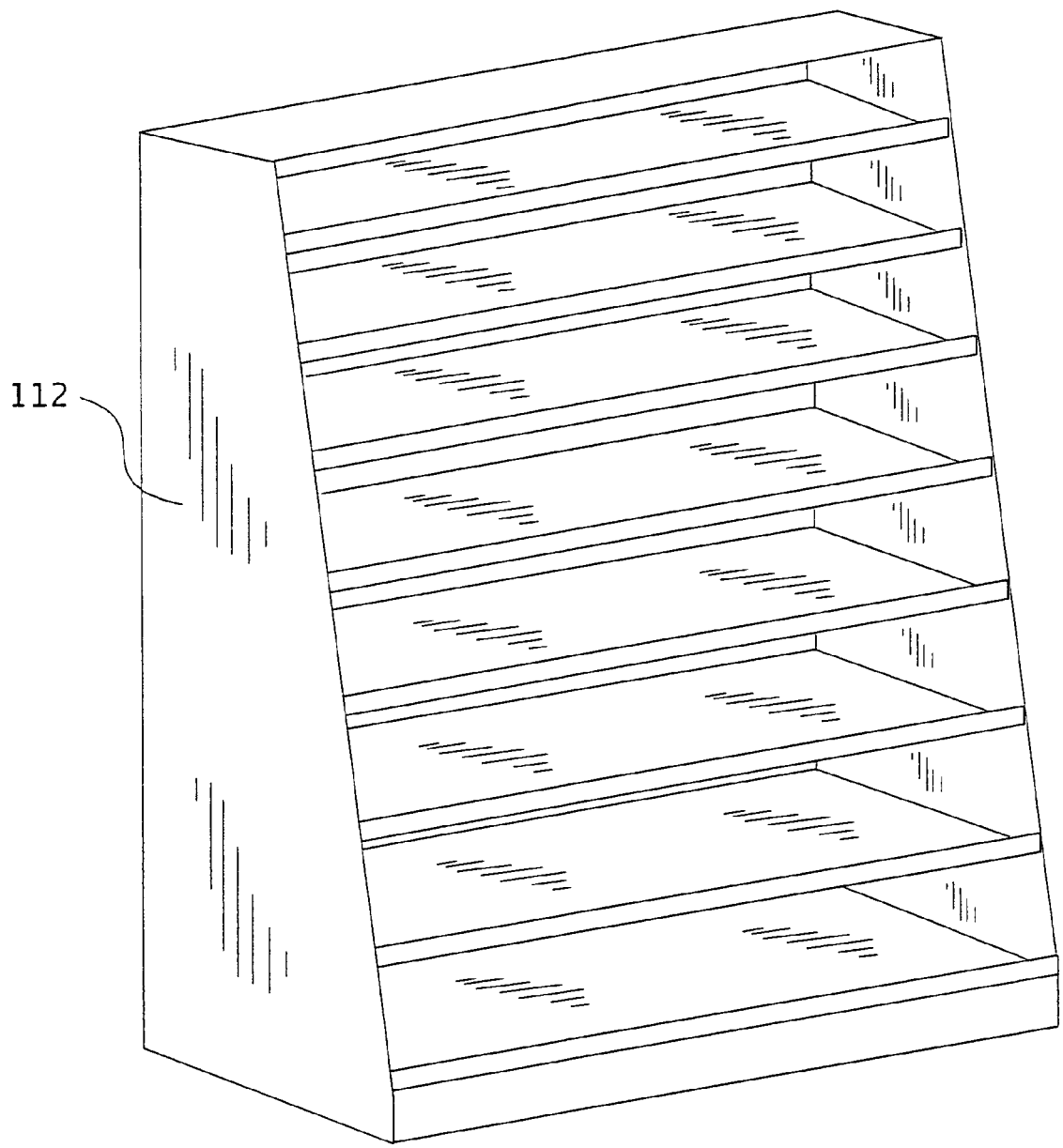
FIG. 9 is a perspective view of a rack display according to the prior art.
Figure 10:
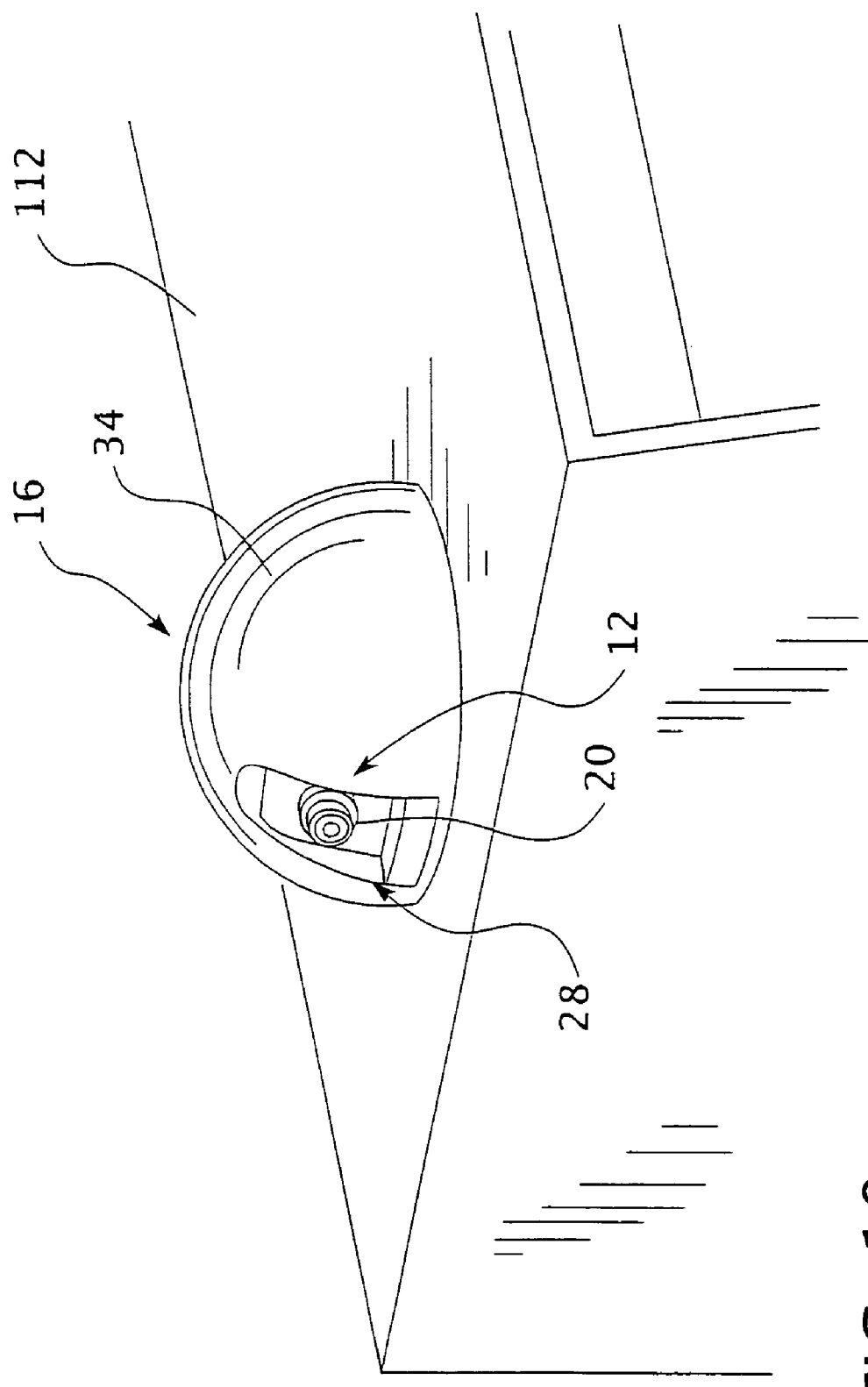
FIG. 10 is a perspective view of one embodiment of a transaction recording system according to the principles of the present invention used in connection with the rack display of FIG. 9.

FIGS. 9-12 illustrate various embodiments that can be used in connection with a rack display 112. An unmodified rack display is illustrated in FIG. 9. As shown in FIG. 10, the semicircular enclosure 34 is placed on a surface of the rack display 112 and operates as discussed above. In some instances, the location of the rack display 112 makes the surfaces of the rack display 112 optimal for viewing various areas of the POS 100, such as immediately in front of the product collection area 116, product scanning area 118 and/or product bagging area 120. In addition, such a location on the rack display 112 allows the video capture device 12 to monitor customer interactions with the rack display 112.

Figure 11:
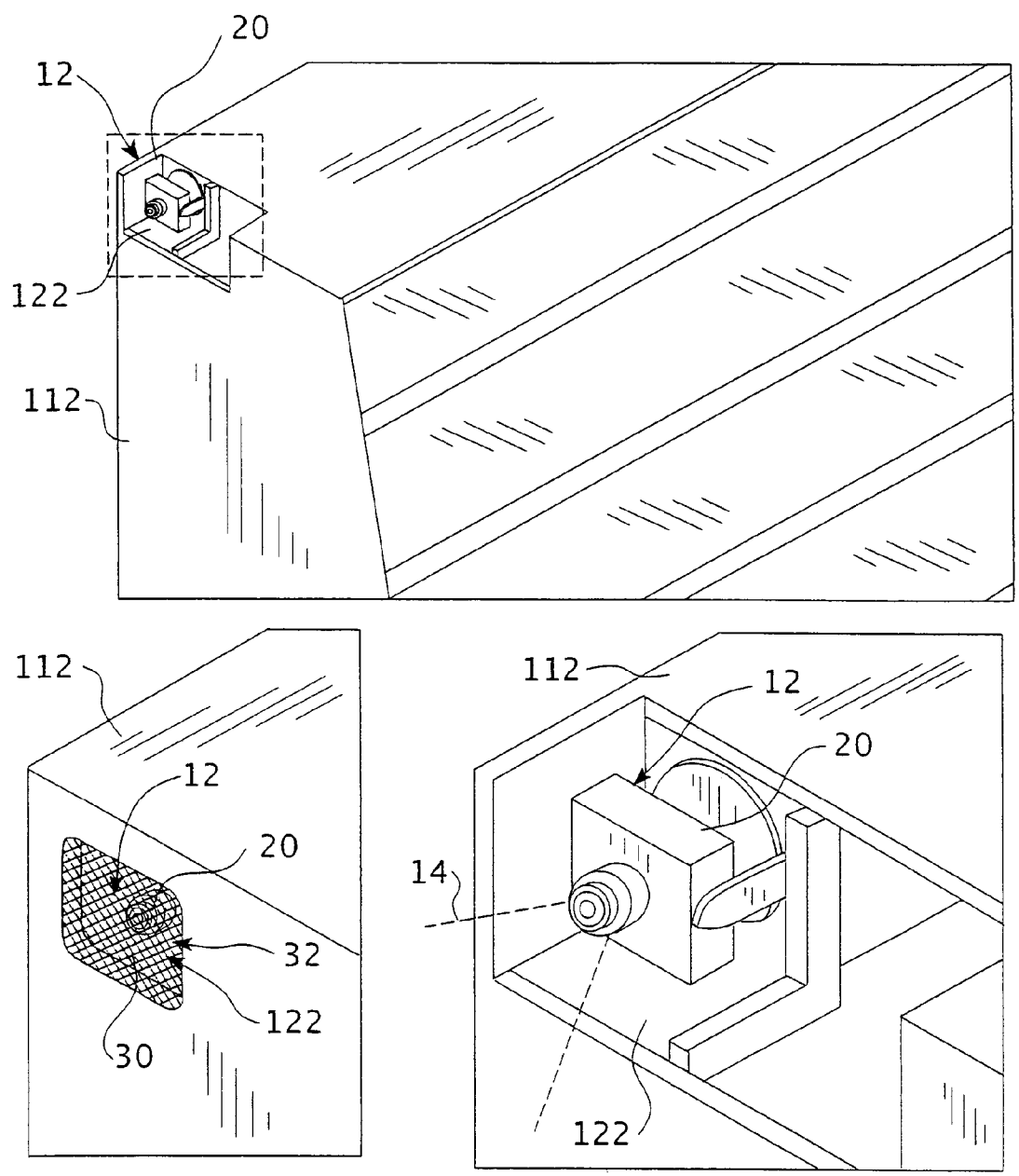
FIG. 11 is a set of perspective and cutaway views of another embodiment of a transaction recording system according to the principles of the present invention used in connection with the rack display of FIG. 9.

In another embodiment, and as illustrated in FIG. 11, the video capture device 12 can be mounted within a portion of the rack display 112, such as a compartment 122. Accordingly, the compartment 122 acts as the enclosure 16 that partially obscures or hides the video capture device 12. In the embodiment of FIG. 11, a grate 32 is positioned on the compartment 122, such that the video capture device 12, or camera 20, can direct the field of vision 14 to the appropriate area at the POS 100.

Figure 12:
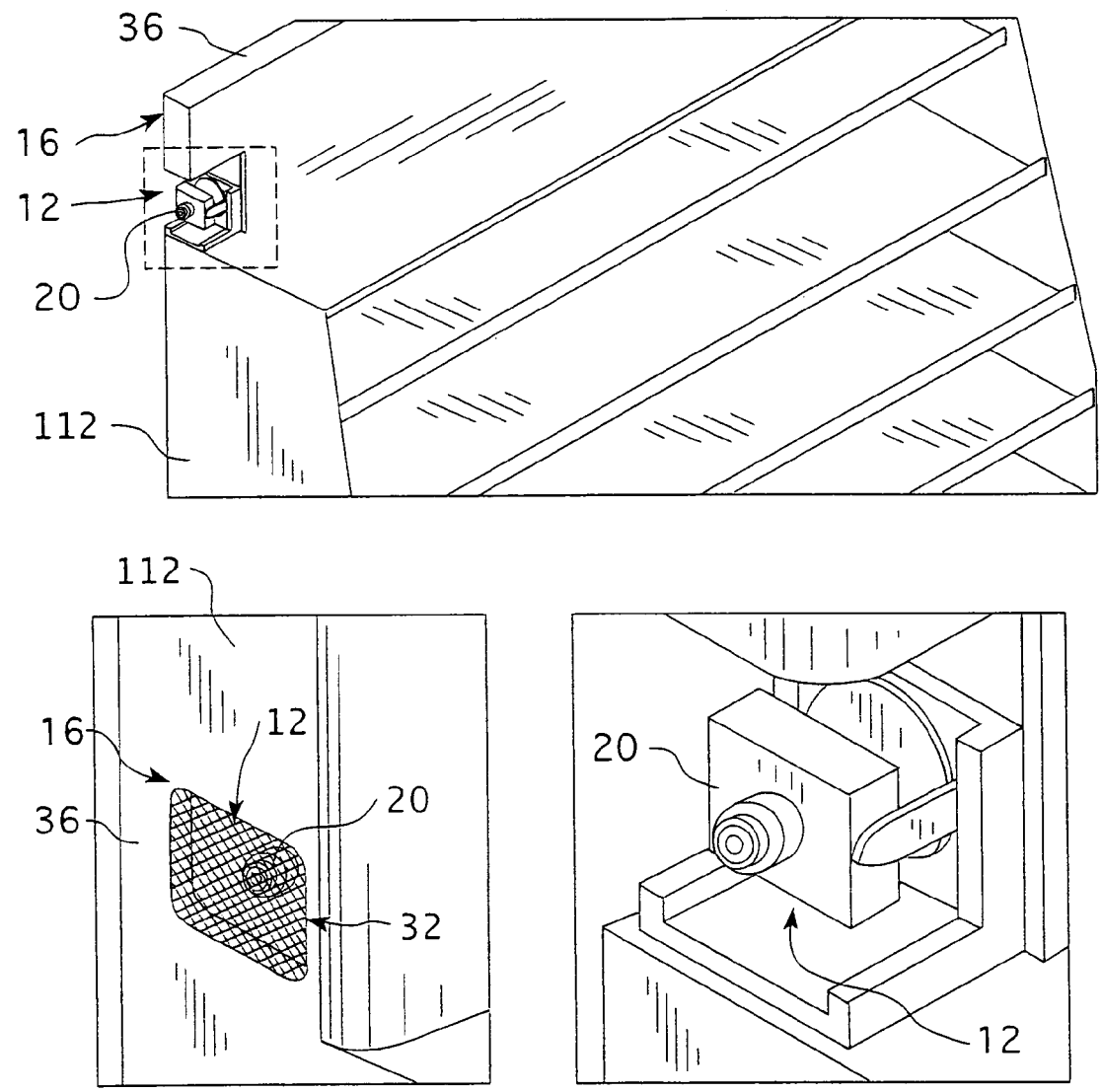
FIG. 12 is a set of perspective and cutaway views of a further embodiment of a transaction recording system according to the principles of the present invention used in connection with the rack display of FIG. 9.

In another embodiment, and as illustrated in FIG. 12, a box enclosure 36 can be mounted on or otherwise integrated with the rack display 112. As discussed above, the video capture device 12, such as the camera 20, is placed within the box enclosure 36, and the field of vision 14 of the video capture device 12 is directed through a grate 32 to the appropriate area of the POS 100. It is further envisioned that the box enclosure 36 be integrated with or otherwise appropriately blend with the environment of the rack display 112, so as not to draw attention to the video capture device 12. For example, the box enclosure 36 could be used for advertising or product display.

It is further envisioned that the field of vision 14 of the video capture device 12 can be angled, movable, user-selectable, etc. For example, during installation, the video capture device 12 can be appropriately adjusted and angled (such as by the above-discussed brackets) to maximize the field of vision 14 of the POS 100. It is also envisioned that the POS processing system 18 or some other processing system may be capable of controlling the angle and other features, characteristics and functions of the video capture device 12 from a remote location. In this manner, the field of vision 14, as well as other characteristics of the video capture device 12 can be adjusted and user-selectable.

As discussed above, the enclosure 16, and thus the video capture device 12, may be mounted on the pole 108 adjacent the POS 100. Therefore, the video capture device 12 can be powered, controlled, operated, etc. through one or more wires extending through an inner area of the pole 108. In addition, the communication between the video capture device 12 and the POS processing system 18 can also be through wires that extend through the pole 108.

Any number of video capture devices 12 are envisioned. For example, the video capture device 12 may be a camera, a video camera, a digital camera, an analog camera, a miniature camera, a pinhole camera, a printed circuit board-controlled camera, a networked camera, a closed-circuit television camera, etc.

As discussed above, the video capture device 12 may be powered from a power supply 38. For example, as seen in FIG. 2, the power supply 38 may be hardwired and provide power through a wire extending through the pole 108 and to the video capture device 12. However, any power supply capable of powering the video capture device 12 is envisioned. For example, the power supply 38 may be an alternating current (AC) power supply, a direct current (DC) power supply, an AC/DC converter, a Siamese cable, a combined video/power cable, a solar power supply, or any combination thereof. Further, an AC/DC converter 40 can be placed in the enclosure 16, such as the marker enclosure 106 to perform conversion, as is known in the art.

Figure 13:
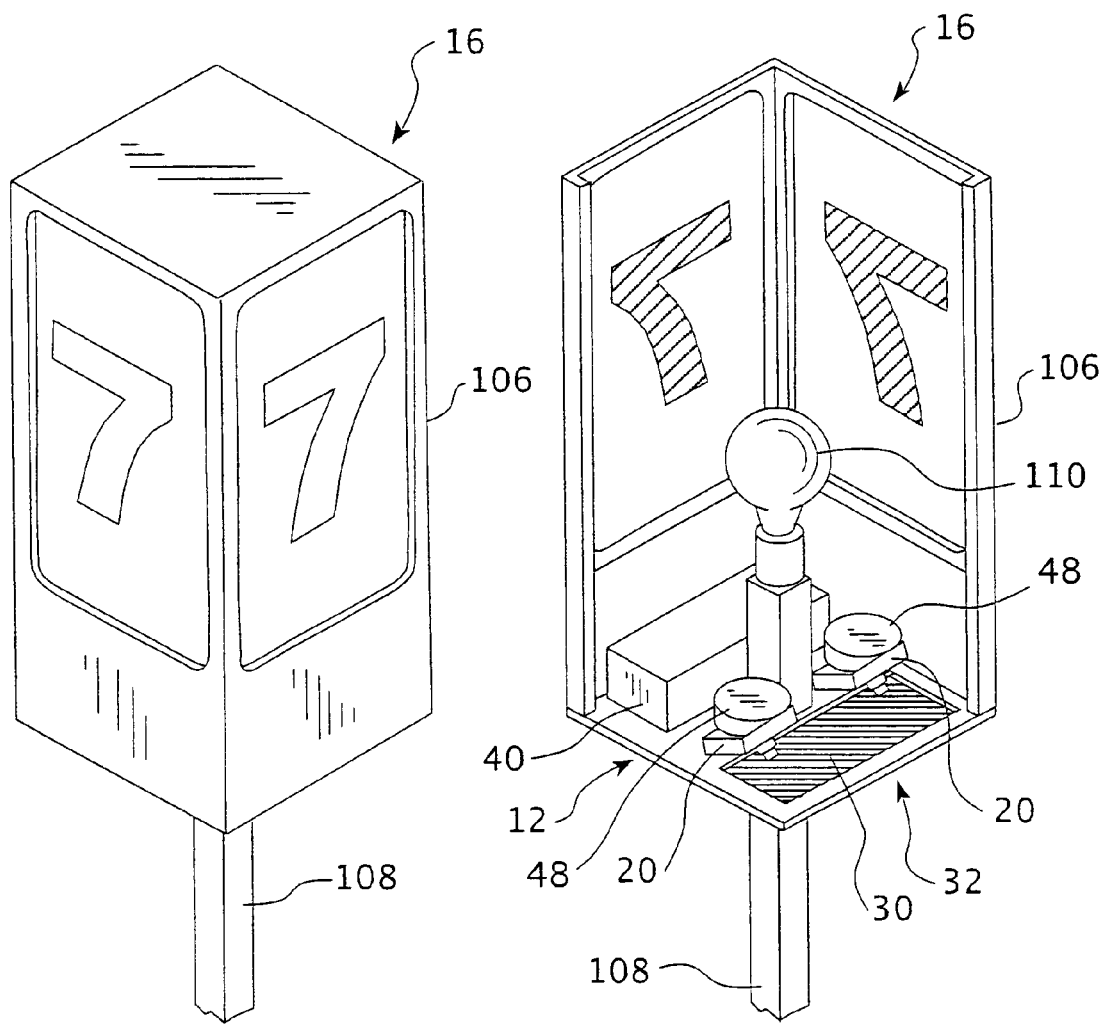
FIG. 13 is a perspective and cutaway view of a further embodiment of a transaction recording system according to the principles of the present invention.

As seen in FIG. 13, the cameras 20 may be powered by a solar power supply 48. As seen in this embodiment, it is envisioned that the marker enclosure 106 be partially transparent, and together with the light 110, the solar power supplies 48 are capable of obtaining light rays and converting these to energy or power in order to power the video capture devices 12. In it also envisioned that the solar power supplies 48 be placed on a surface outside of the enclosure 16. The solar power supply 48 represents only one of the various options of the powering capabilities of the present invention.

Figure 14:
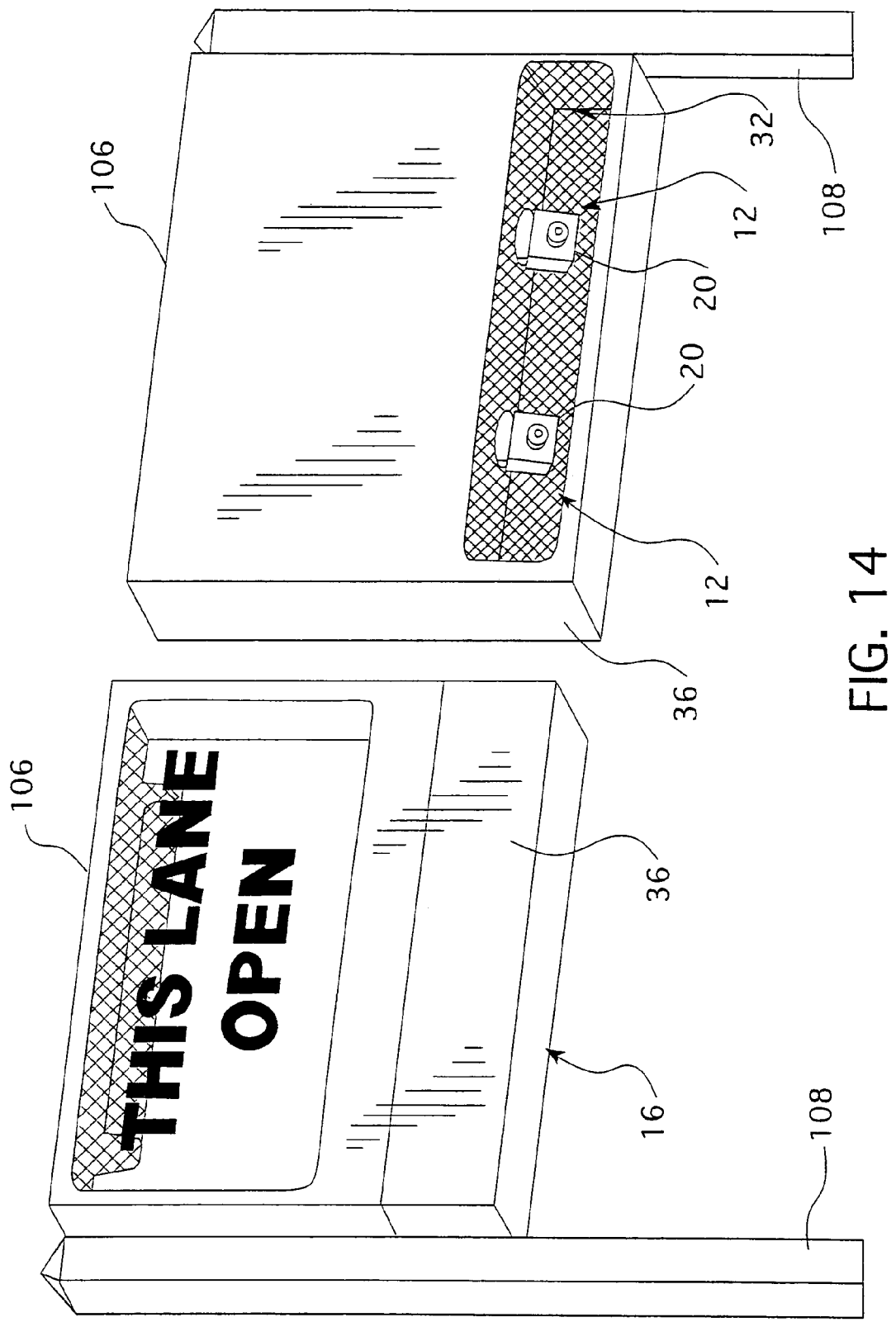
FIG. 14 is a front and rear perspective view of another embodiment of a transaction recording system according to the principles of the present invention.

FIG. 14 illustrates an embodiment similar to FIG. 7, however, as opposed to using the attached box enclosure 36 of FIG. 7, the marker enclosure 106 acts as the enclosure 16. In particular, the marker enclosure 106 is specifically constructed to appropriately house the video capture devices 12, such as the camera 20.

The video capture device 12 and the POS processing system 18, such as the POS data converter 22 and the POS central processing unit 24, can communicate in a variety of manners, as is known in the art. For example, the communication may be hardwired, through coaxial cabling, through network cabling, through fiber optic cabling, in a wireless format, over a wireless network, etc. In addition, the field of vision 14 of the video capture device 12 may include a variety of portions of the POS 100, such as the checkout lane 102, an employee, a cashier, a bagger, a customer, a cash register 114, the product collection area 116, the product scanning area 118, the product bagging area 120, a product display area, such as the rack display 112, etc.

The present invention is also directed to a transaction recording system 10 that includes multiple video capture devices 12, each video capture device 12 including a respective field of vision 14. The video capture devices 12 are arranged and operated as discussed above. In this embodiment, each of the video capture devices 12 are in communication with the POS processing system 18, which again is located at or near the POS 100. The POS processing system 18 receives, processes, stores and/or transmits the video data signals from each of the video capture devices 12 as discussed above.

Figure 15:
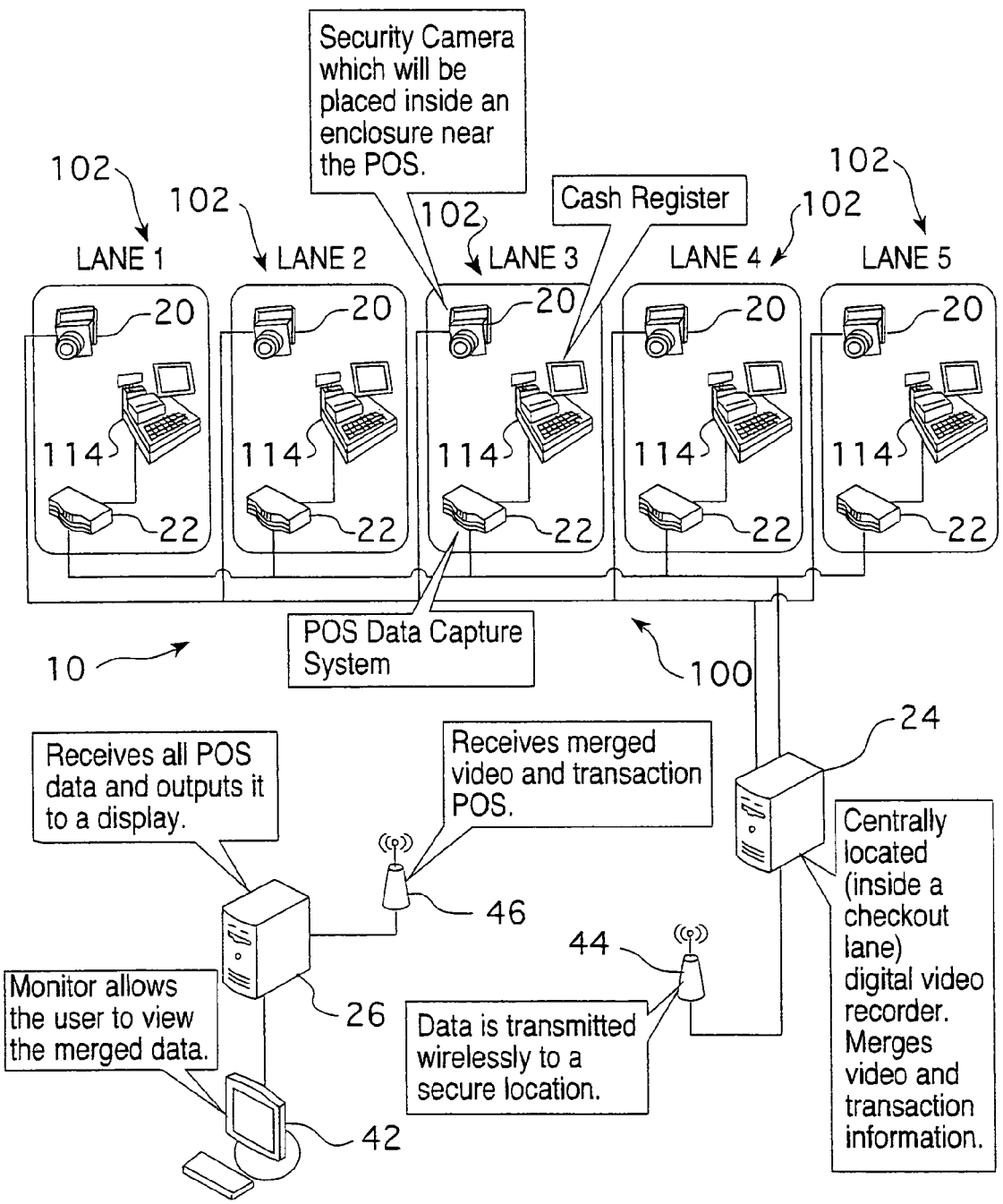
FIG. 15 is a schematic view of one embodiment of a transaction recording system according to the principles of the present invention at multiple points-of-sale.

In one embodiment, and as illustrated in schematic form in FIG. 15, each POS 100 includes a POS data converter 22 in communication with and configured to receive POS data from a respective cash register 114 or POS 100. In this embodiment, each of the POS data converters 22 are in communication with and transmit data to the POS central processing unit 24, which acts and operates as discussed above.

Also as shown in the embodiment of FIG. 15, a central storage and processing system 26 is placed remotely from the POS 100 and includes a monitor 42, through which the user can view and otherwise interact with the integrated data sent from the POS central processing unit 24 to the central storage and processing system 26. Still further, this embodiment illustrates wireless communication between the POS central processing unit 24 and the central storage and processing system 26. Specifically, a wireless transmitter 44 is operated by or otherwise in communication with the POS central processing unit 24. Further, a wireless receiver 46 is operated by or otherwise in communication with the central storage and processing system 26. The wireless transmission, receipt and processing of digital data between the various systems and components of the present invention occurs as is known in the art. For example, various wireless transmitters 44 can be used to communicate data from the video capture devices 12, cameras 20, POS data converter 22, etc.

Figure 16:
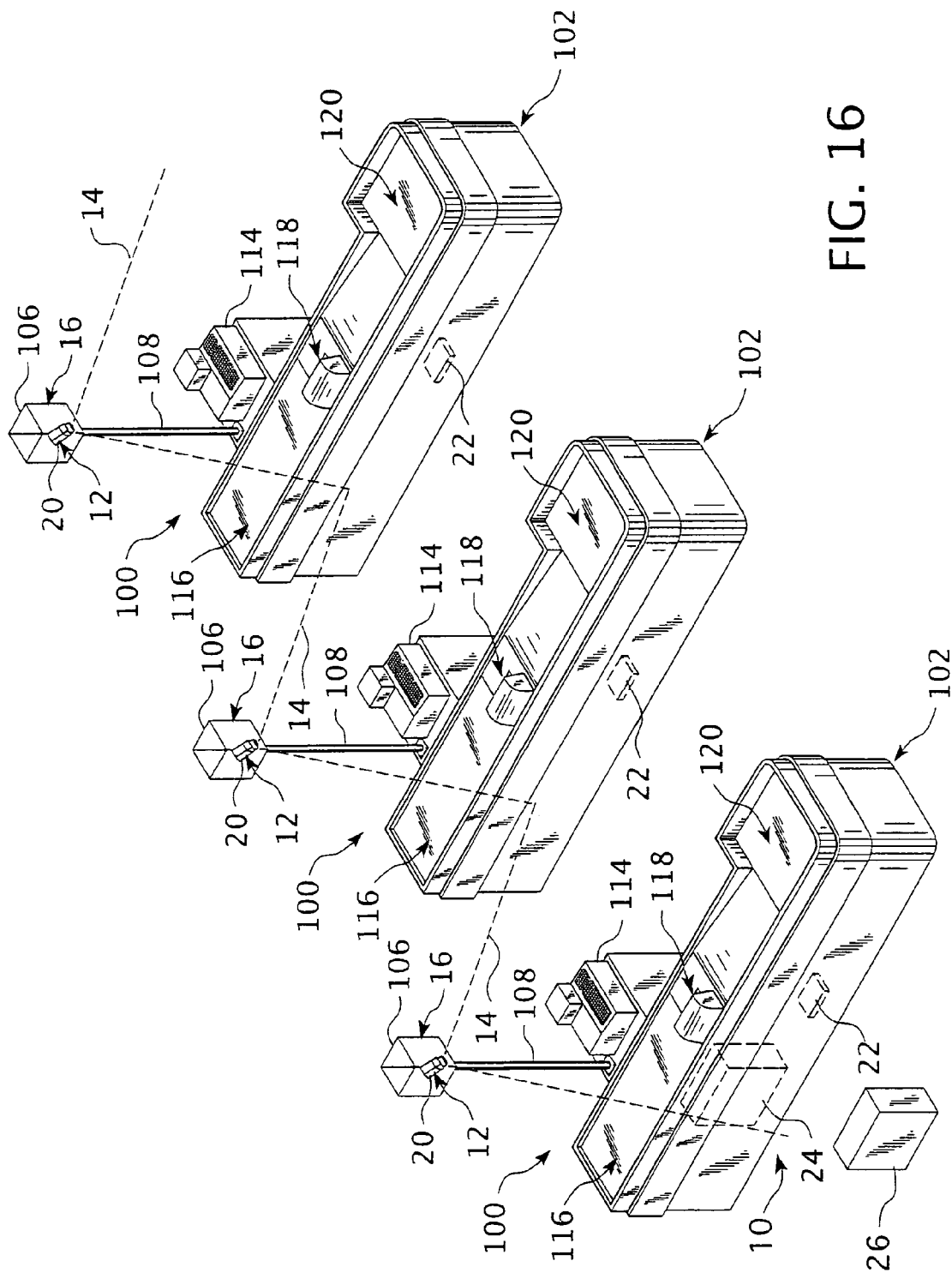
FIG. 16 is a perspective and cutaway view of another embodiment of a transaction recording system according to the principles of the present invention at multiple points-of-sale.
Figure 17:
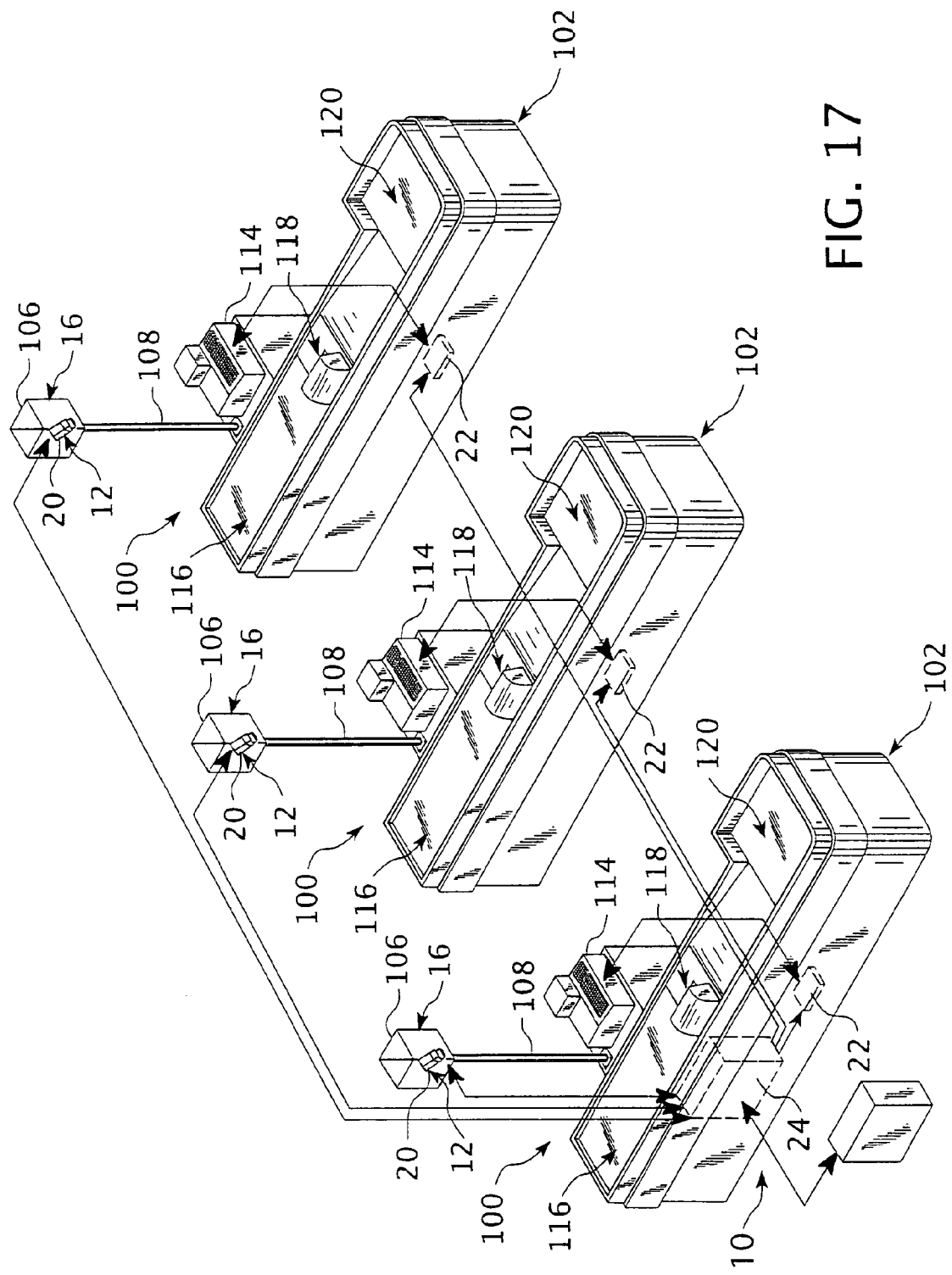
FIG. 17 is a perspective, cutaway and schematic view of the transaction recording system and points-of-sale of FIG. 16.

FIG. 16 illustrates this use of multiple video capture devices 12 in connection with multiple checkout lanes 102 in, for example, a supermarket. Again, each checkout lane 102 includes a respective video capture device 12 and POS data converter 22. The POS central processing unit 24 is positioned at only a single POS 100, namely only one of the multiple checkout lanes 102. As seen in FIG. 17, the various video capture devices 12, POS data converters 22 and POS central processing unit 24 communicate and operate as discussed above. In addition, the POS central processing unit 24 is in communication with the central storage processing system 26.

As discussed above, the enclosure 16 may be formed in a variety of shapes, sizes and designs. Further, and also as discussed, the enclosure 16 may be designed in various ornamental shapes for use in connection with the lane marker 104. A first embodiment of an ornamental design of the enclosure 16 is illustrated in FIGS. 18-25. A second embodiment of the enclosure 16 is illustrated in FIGS. 26-33. A third embodiment of the enclosure 16 is illustrated in FIGS. 34-40. A fourth embodiment of the enclosure 16 is illustrated in FIGS. 41-47. Further, a fifth embodiment of the enclosure 16 is illustrated in FIGS. 48-55, and finally, a sixth embodiment of the enclosure 16 is illustrated in FIGS. 56-62. In the embodiments of FIGS. 18-55, the enclosures 16 are illustrated in use in connection with a variety of styles and structures of the lane marker 104 and marker enclosure 106. The embodiment of the enclosure in FIGS. 56-62 illustrates the enclosure 16 as mounted to the pole 108. These embodiments illustrate various design options for the enclosure 16.

In one embodiment, the video capture device 12 is a camera 20 that is using closed-circuit television technology. In addition, the bottom surface of the enclosure 16 may be angled to provide the camera 20 with the optimal field of vision 14.

In one embodiment, the light 110 may be mounted directly to the enclosure 16. In another embodiment, the top of the enclosure 16 is completely enclosed, such that no light can enter the enclosure 16 from above. The only surface where light can enter the enclosure 16 is through a small window or surface 28 positioned on the bottom of the camera enclosure 16. This window may be concealed by a tinted plastic cover.

In this manner, the transaction recording system 10 provides many benefits over the prior art. For example, the transaction recording system 10 of the present invention provides optimal viewing angle of the intended subjects and transaction. The system 10 may include various video capture device 12 or camera 20 locations, which will enable the viewer to see a much closer and less obstructed view of the transactions and interactions occurring between the customer and cashier.

Another advantage of the transaction recording system 10 of the present invention is the concealment of the video capture devices 12 or cameras 20. By concealing the cameras 20, the customers will not feel uncomfortable, such as they often feel when they are being "watched". Next, if the customer and/or the cashier knows where the camera 20 is positioned, they can easily position themselves in a way that will prevent the camera from viewing its intended field of vision 14. The transaction recording system 10 of the present invention, and specifically the concealed camera 20, overcomes this problem.

Also, as discussed above, the transaction recording system 10 of the present invention can be useful in connection with or in a casino. In particular, many gambling tables and the like include markers with marker enclosures mounted on a pole. As is known in the art, the marker typically indicates what game the customer is able to engage in at any particular table. Accordingly, the transaction recording system 10 is useful in such a setting since the video capture devices 12 or cameras 20 are concealed, and the customers and dealers will not know how often, when or how they are being "watched". As discussed above in connection with the cashier scenario, if the customer or dealer knows where the camera 20 is positioned, they can also easily position themselves in a way that will prevent the camera from viewing its intended field of vision 14. The transaction recording system 10 of the present invention prevents this from occurring. Still further, in the casino setting, placing a video capture device 12 in a specified position with respect to multiple tables allows a much more tailored and specific field of vision 14, as opposed to the broad and less accurate "eye in the sky" view. Specifically, the transaction recording system 10 reduces obstructions in the line-of-sight between the camera 20 and the subject.

Further, the transaction recording system 10 provides optimal camera 20 angle for viewing transactions and interactions and reduces the total number of cameras 20 needed to record such transactions and interactions. Still further, the transaction recording system 10 requires less storage space and has a longer capture period, and also provides higher resolution and requires fewer cables. Still further, the transaction recording system 10 includes video capture devices 12 that have smaller power consumption requirements and cost less. In addition, the POS processing system 18 of the transaction recording system 10 allows for integration of the POS 100 data and the video signals and data at the POS 100, which drastically reduces the amount of necessary cabling and the chance of cable failure. Still further, the use of a secured and remote central storage and processing system 26 allows for viewing of the integrated signal in a closely supervised location.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A transaction recording system for use in recording a transaction occurring at a point-of-sale, the system comprising:
   a video capture device having a field of vision and configured to capture, produce and transmit video data signals representative of the field of vision of the device, wherein the video capture device is at least partially concealed within a separate enclosure and located in an elevated position with respect to at least a portion of the point-of-sale; and
   a point-of-sale processing system located at or near the point-of-sale and configured to: (i) receive video data signals; (ii) process video data signals; (iii) store video data signals; (iv) transmit video data signals, or any combination thereof;
   wherein the field of vision of the video capture device views at least a portion of the point-of-sale during at least a portion of the transaction;
   wherein the enclosure is mounted on a pole adjacent the point-of-sale, wherein a lane marker is attached to at least a portion of the enclosure.

2. The system of claim 1, wherein the processing system is configured to: (i) generate point-of-sale data; (ii) process point-of-sale data; (iii) receive point-of-sale data, or any combination thereof.

3. The system of claim 2, wherein the point-of-sale data is transaction time, transaction date, transaction location, transaction data, point-of-sale location, employee data, employer data, customer data, goods data, item data, identification data, register data, employee/customer interaction data, installation data or any combination thereof.

4. The system of claim 2, wherein the processing system is configured to integrate video data signals received from the video capture device and point-of-sale data into an integrated data signal.

5. The system of claim 4, wherein the integrated data signal is transmitted to a central storage and processing system in communication with the point-of-sale processing system.

6. The system of claim 5, wherein the central storage and processing system is positioned in a secured location away from the point-of-sale.

7. The system of claim 1, wherein the enclosure is positioned adjacent, on, within or integrated with a lane marker, a checkstand light, a checkout lane sign, a rack display, a cash register, a dome, an elevated enclosure or any combination thereof.

8. The system of claim 1, wherein the enclosure further comprises a transparent surface or opening, such that the video capture device is capable of capturing video data signals when the field of vision is directed through the transparent surface or opening.

9. The system of claim 8, wherein the transparent surface is clear plastic, tinted plastic, clear glass, tinted glass or any combination thereof.

10. The system of claim 8, wherein the opening is at least a portion of a vent, a grate, a crack, an orifice or any combination thereof.

11. The system of claim 1, wherein the field of vision of the video capture device preset, angled, moveable, user-selectable or any combination thereof.

12. The system of claim 1, wherein the enclosure is mounted on a pole adjacent the point-of-sale, and wherein the video capture device is powered, controlled, operated or any combination thereof through at least one wire extending through an inner area of the pole.

13. The system of claim 1, wherein the video capture device is a camera, a video camera, a digital camera, an analog camera, a miniature camera, a pin-hole camera, a printed circuit board-controlled camera, a networked camera, a closed-circuit television camera or any combination thereof.

14. The system of claim 1, further comprising a power supply in communication with the video capture device and configured to supply power to the video capture device for operation.

15. The system of claim 14, wherein the power supply is alternating current (AC) power supply, direct current (DC) power supply, an AC/DC converter, a siamese cable, a combined video/power cable, a solar power supply, or any combination thereof.

16. The system of claim 1, wherein communication between the video capture device and the processing system is hardwired, coaxial cabling, network cabling, fiber optic cabling, wireless, wireless network or any combination thereof.

17. The system of claim 1, wherein the field of vision of the video capture device includes a checkout lane, an employee, a cashier, a bagger, a customer, a cash register, a product collection area, a product scanning area, a product bagging area, a product display area, or any combination thereof.

18. The system of claim 1, wherein the field of vision that the video capture device includes a specified area, a table, a gambling table, an employee, a dealer, a customer, an observer, a gambling area, a slot machine, or any combination thereof.

19. A transaction recording system for use in recording a transaction occurring at a point-of-sale, the system comprising:
- a plurality of video capture devices, each having a respective field of vision and configured to capture, produce and transmit video data signals representative of the field of vision of the device, wherein each video capture device is at least partially concealed within a separate enclosure and located in an elevated position with respect to at least a portion of a respective point-of-sale; and
- a point-of-sale central processing system in communication with the plurality of video capture systems and located at or near a point-of-sale, wherein the processing system is configured to: (i) receive video data signals from the video capture devices; (ii) process video data signals from the video capture devices; (iii) store video data signals from the video capture devices; (iv) transmit video data signals from the video capture devices, or any combination thereof;
- wherein the field of vision of each video capture device views at least a portion of the respective point-of-sale during at least a portion of the transaction;
- wherein the enclosure is mounted on a pole adjacent the point-of-sale, wherein a lane marker is attached to at least a portion of the enclosure.

20. The system of claim 19, further comprising a plurality of point-of-sale data converters positioned at or near a respective point-of-sale and configured to (i) generate point-of-sale data; (ii) process point-of-sale data; (iii) receive point-of-sale data, or any combination thereof.

21. The system of claim 19, further comprising a central storage and processing system in communication with the point-of-sale processing system, wherein the central storage and processing system is positioned in a secured location away from the point-of-sale.

* * * * *